(12) United States Patent
Kawashima

(10) Patent No.: US 11,608,033 B2
(45) Date of Patent: Mar. 21, 2023

(54) WINDSHIELD WIPER CONNECTOR

(71) Applicant: Pylon Manufacturing Corporation, Deerfield Beach, FL (US)

(72) Inventor: Hiroshi Kawashima, Sunrise, FL (US)

(73) Assignee: PYLON MANUFACTURING CORPORATION, Deerfield Beach, FL (US)

( * ) Notice: Subject to any disclaimer, the term of this patent is extended or adjusted under 35 U.S.C. 154(b) by 0 days.

(21) Appl. No.: 17/398,889

(22) Filed: Aug. 10, 2021

(65) Prior Publication Data

US 2022/0024418 A1    Jan. 27, 2022

Related U.S. Application Data

(63) Continuation-in-part of application No. 16/882,676, filed on May 25, 2020, which is a continuation of
(Continued)

(51) Int. Cl.
     *B60S 1/40*        (2006.01)
     *B60S 1/38*        (2006.01)

(52) U.S. Cl.
     CPC ............. *B60S 1/4038* (2013.01); *B60S 1/387* (2013.01); *B60S 1/3851* (2013.01);
(Continued)

(58) Field of Classification Search
     CPC .... B60S 1/4003; B60S 1/4074; B60S 1/4077; B60S 1/4083; B60S 1/4038; B60S 1/4041; B60S 1/4045; B60S 1/4048; B60S 1/4064; B60S 2001/408; B60S 1/3851; B60S 1/4087; B60S 1/407; B60S 1/387
(Continued)

(56) References Cited

U.S. PATENT DOCUMENTS 9,688,251 B2 *   6/2017   Ku .................... B60S 1/4077
2006/0130263 A1 *   6/2006   Coughlin ............ B60S 1/40
                                         15/250.31
(Continued)

FOREIGN PATENT DOCUMENTS

| EP | 2762369 | * | 2/2013 |
| FR | 2838693 | * | 10/2003 |

OTHER PUBLICATIONS

English translation of description portion of French publication 2838693, published Oct. 2003. (Year: 2003).*

*Primary Examiner* — Gary K. Graham
(74) *Attorney, Agent, or Firm* — BakerHostetler

(57) ABSTRACT

A windshield wiper connector is disclosed for connecting a variety of wiper arms with a wiper blade. The connector may include a rotating cap as well as an adapter. The adapter may be inserted into a trapezoidal groove, and the adapter may have a pin passage for receiving a pin from a wiper arm. The groove may receive a trapezoidal roller from a wiper arm. The connector may include a channel, and a bayonet style wiper arm may be secured in the channel as well as by the cap and by a pillar projecting from the channel. Other similar wiper arms may be connected with a wiper blade using the disclosed inventive concepts. A wiper blade assembly having a wiper strip, a force distribution structure, and a connector is also disclosed.

36 Claims, 19 Drawing Sheets

Related U.S. Application Data application No. 15/600,201, filed on May 19, 2017, now Pat. No. 10,661,759.

(60) Provisional application No. 63/063,953, filed on Aug. 10, 2020, provisional application No. 62/338,990, filed on May 19, 2016.

(52) U.S. Cl.
CPC ........... B60S 1/4003 (2013.01); B60S 1/4083 (2013.01); *B60S 1/407* (2013.01); *B60S 1/4041* (2013.01); *B60S 1/4045* (2013.01); *B60S 1/4048* (2013.01); *B60S 1/4074* (2013.01); *B60S 1/4077* (2013.01); *B60S 1/4087* (2013.01)

(58) Field of Classification Search
USPC ...................................... 15/250.32
See application file for complete search history.

(56) References Cited

U.S. PATENT DOCUMENTS

| | | | |
|---|---|---|---|
| 2010/0050361 A1* | 3/2010 | Chang .................... | B60S 1/387 |
| | | | 15/250.32 |
| 2013/0067674 A1* | 3/2013 | Chiang ................ | B60S 1/4003 |
| | | | 15/250.32 |
| 2015/0089764 A1* | 4/2015 | Wu ....................... | B60S 1/4003 |
| | | | 15/250.32 |

* cited by examiner

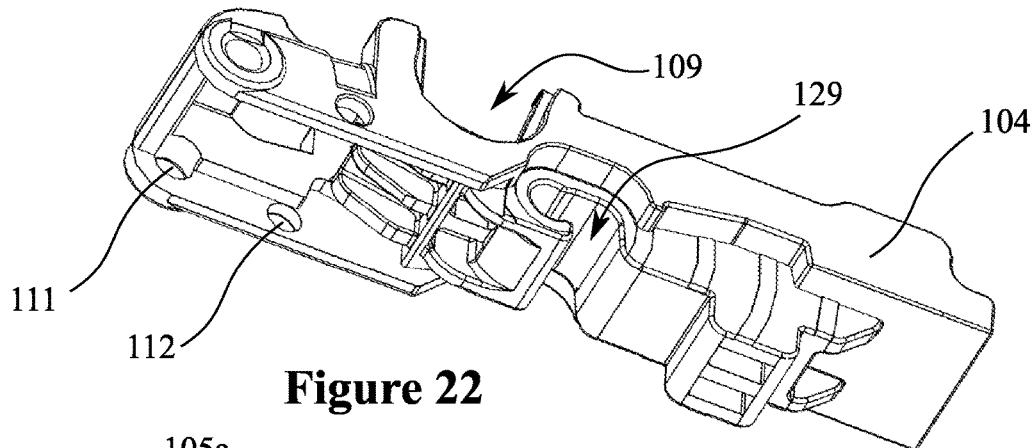
Figure 22
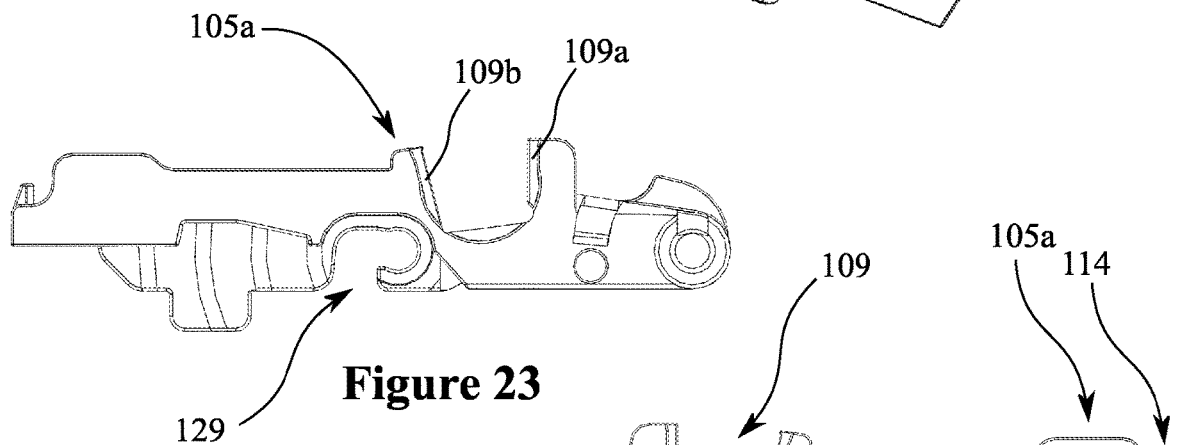
Figure 23
Figure 24
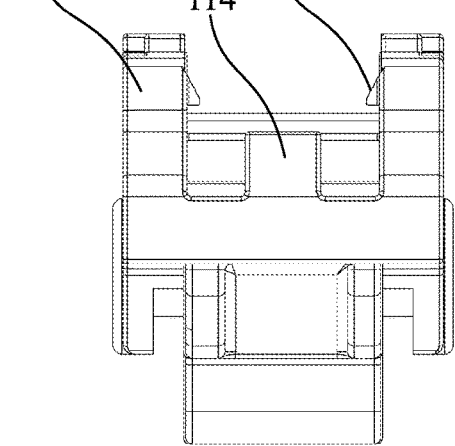
Figure 25
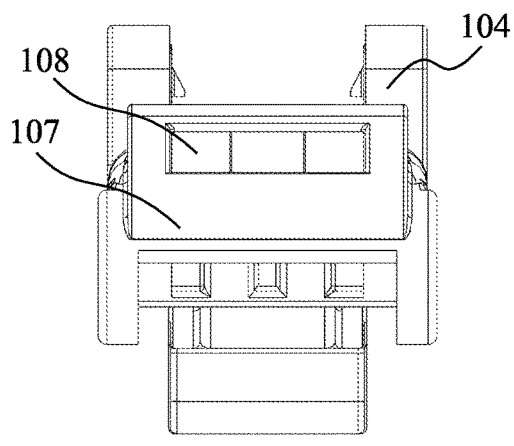
Figure 26

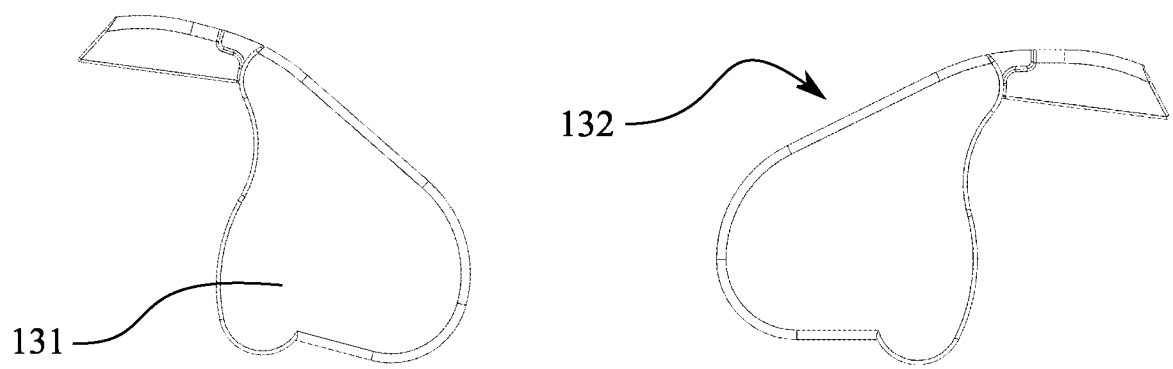
Figure 30    Figure 31
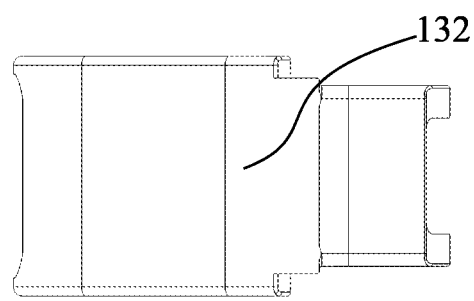
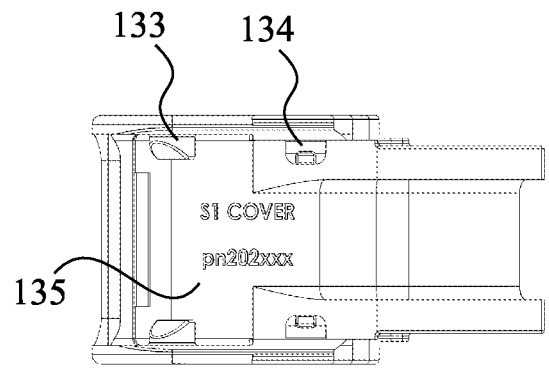
Figure 32    Figure 33
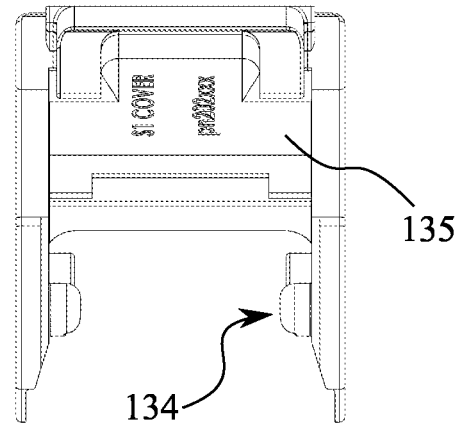
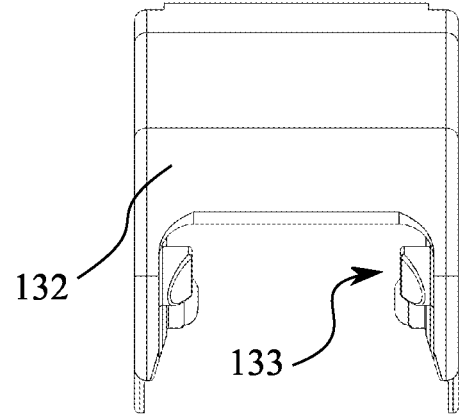
Figure 34    Figure 35

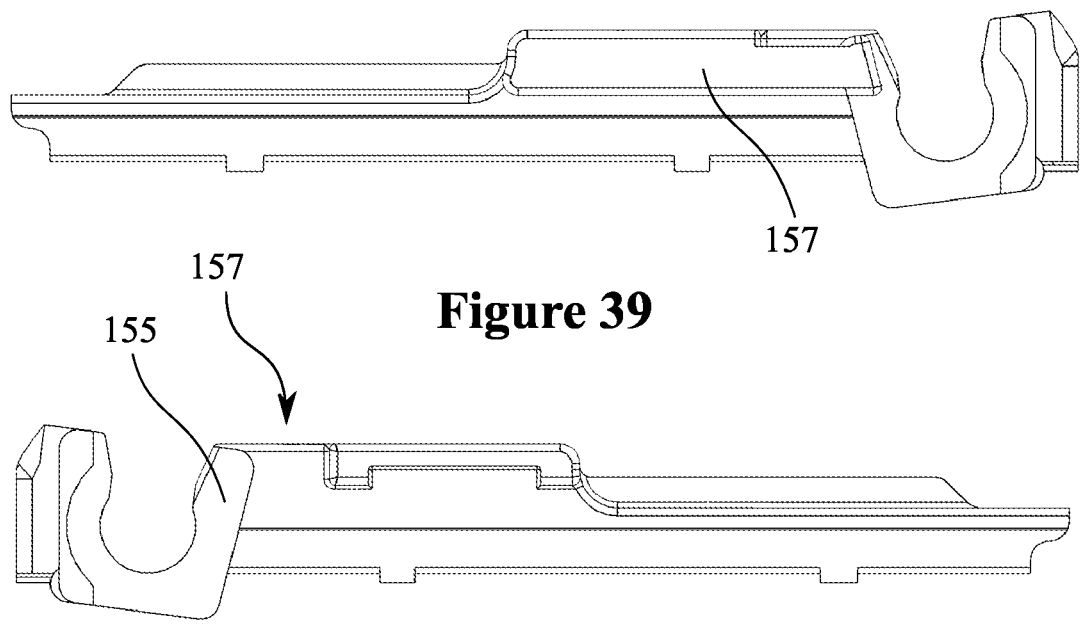
Figure 39
Figure 40
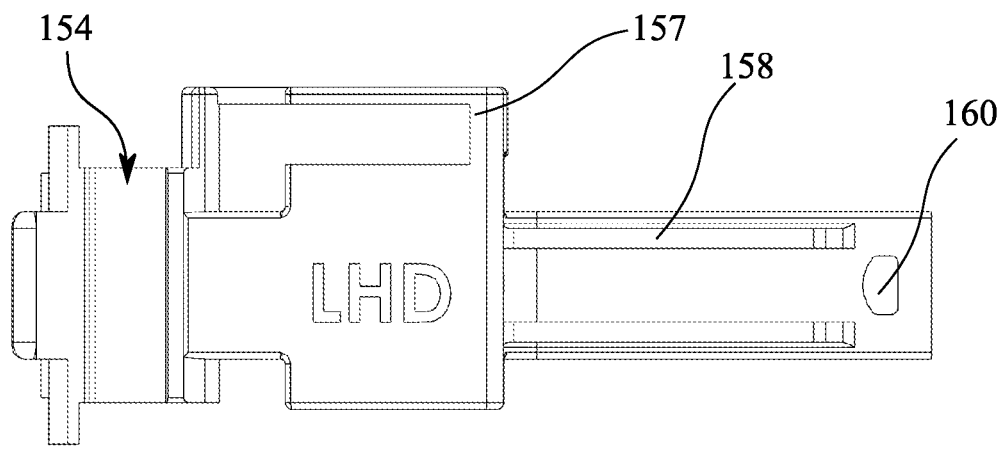
Figure 41
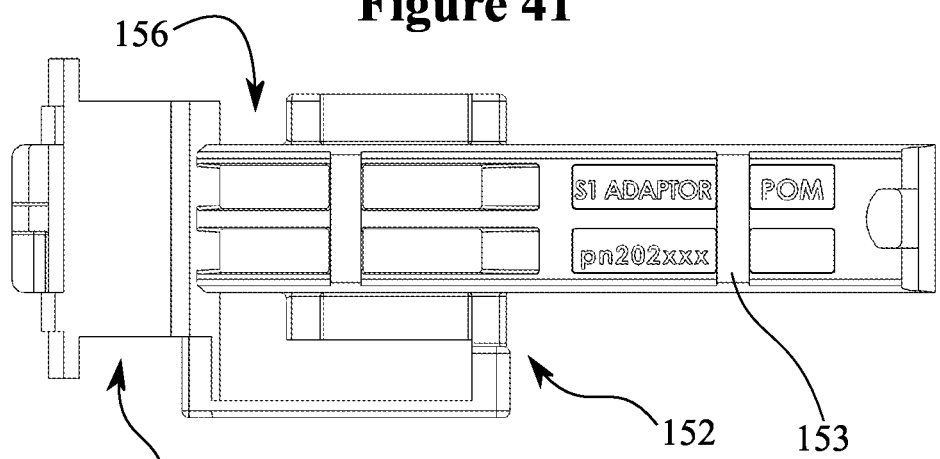
Figure 42

WINDSHIELD WIPER CONNECTOR

CROSS REFERENCE TO RELATED APPLICATIONS

This application claims priority to U.S. Provisional Application No. 63/063,953 filed on Aug. 10, 2020. This application is also a continuation-in-part of U.S. Ser. No. 16/882,676 filed on May 25, 2020, which is a continuation of U.S. Ser. No. 15/600,201 filed on May 19, 2017, which claims the benefit of U.S. Provisional Application No. 62/338,990 filed on May 19, 2016, the disclosures of which are hereby incorporated herein by reference in their entirety.

TECHNICAL FIELD

This invention relates in general to windshield wipers, and more particularly, to an improved connector for a windshield wiper that allows the windshield wiper to be attached to multiple windshield wiper arm configurations. The invention is also directed to windshield wipers incorporating these novel connectors.

BACKGROUND OF THE INVENTION

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture Thus, there is a need for inexpensive connectors that are capable of securing a windshield wiper blade to a variety of arms. In particular, it would be desirable to have a connector that can be attached to a wiper blade that will allow the wiper blade to be locked to a wide variety of wiper arms despite their various locking mechanisms. It would also be desirable to have a windshield wiper connector that can be fabricated or molded as a single piece at low-cost. The prior art fails to provide a low-cost windshield wiper connector capable of attachment to a wide variety of windshield wiper arms, much less for the purpose of reducing the amounts of inventory parts required to supply a vehicle market that uses a wide variety of windshield wiper arm types.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment of the invention, a windshield wiper connector may be for connecting a plurality of types of wiper arms with a windshield wiper. The connector may have a proximal end and a distal end longitudinally opposed to the proximal end. The connector may include opposing peripheral side walls defining a channel therebetween, a groove provided in the channel defined by aligned breaks in the opposing side walls, and an adapter having a groove insert with an outer surface having conforming dimensions with a groove and an inner surface defining a pin passage. The groove insert of the adapter may be securable with the groove. A first wiper arm type is securable in the channel, a second wiper arm type is securable in the groove, and a third wiper arm type is securable in the pin passage.

BRIEF DESCRIPTION OF THE DRAWINGS

FIG. 22 is a bottom perspective view of the connector of FIG. 18 without a cap and without an adapter.

FIG. 23 is a side view of the connector of FIG. 18 without a cap and without an adapter.

FIG. 24 is an opposing side view of the connector of FIG. 18 without a cap and without an adapter.

FIG. 25 is a distal end view of the connector of FIG. 18 without a cap and without an adapter.

FIG. 26 is a proximal end view of the connector of FIG. 18 without a cap and without an adapter.

FIG. 30 is a side view of the cap of the connector of FIG. 18.

FIG. 31 is an opposing side view of the cap of the connector of FIG. 18.

FIG. 32 is a top view of the cap of the connector of FIG. 18.

FIG. 33 is a bottom view of the cap of the connector of FIG. 18.

FIG. 34 is a distal end view of the cap of the connector of FIG. 18.

FIG. 35 is a proximal end view of the cap of the connector of FIG. 18.

FIG. 39 is a side view of the adapter of the connector of FIG. 18.

FIG. 40 is an opposing side view of the adapter of the connector of FIG. 18.

FIG. 41 is a top view of the adapter of the connector of FIG. 18.

FIG. 42 is a bottom view of the adapter of the connector of FIG. 18.

DETAILED DESCRIPTION OF THE DISCLOSURE

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In one embodiment of the invention, a windshield wiper connector may be for connecting a plurality of types of wiper arms with a windshield wiper. The connector may have a proximal end and a distal end longitudinally opposed to the proximal end. The connector may include opposing peripheral side walls defining a channel therebetween, a groove provided in the channel defined by aligned breaks in the opposing side walls, and an adapter having a groove insert with an outer surface having conforming dimensions with a groove and an inner surface defining a pin passage. The groove insert of the adapter may be securable with the groove. A first wiper arm type is securable in the channel, a second wiper arm type is securable in the groove, and a third wiper arm type is securable in the pin passage. Each of the opposing peripheral side walls may include a cap pivot hole and a cap connector securing hole, and the cap includes a pair of internal cap pivot projections each engageable with a cap pivot hole and a pair of internal cap securing projections each engageable with a cap securing hole. The cap may be pivotable about a cap pivot axis defined as extending between the cap pivot holes. The cap may include a top cap wall that covers the groove when the cap is pivoted into a closed position. Resilient tabs may be laterally projecting into the channel. A pillar may be provided within the channel projecting away from the channel. The tail may include a pillar hole to accommodate a pillar projecting away from the channel. The adapter may include a platform connected to the groove insert, and the platform may include a handle projecting laterally away from the platform beyond the side wall of the connector. The platform may be connected by a platform bridge having a width that is narrower than the platform In further embodiments, a cap may be provided on the proximal end of the connector.

In some embodiments the connector may be fabricated as a single piece.

In addition, the connector is configured such that the orientation of either the windshield wiper or the connector can be reversed based on the particular windshield wiper arm that is being used.

Figure 1:
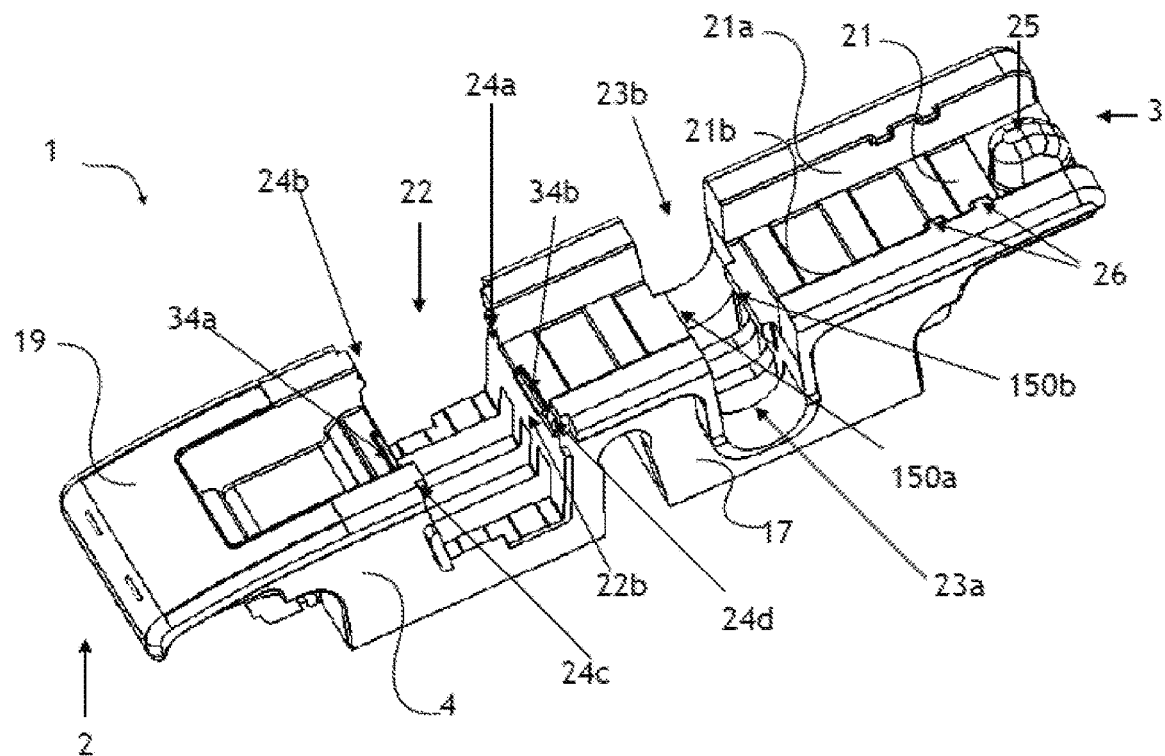
FIG. 1 is a top perspective view of an embodiment of a connector of the disclosure.

FIG. 1 is a top, perspective view of an embodiment of a connector 1 of the disclosure. The connector 1 has a proximal end 2, and a distal end 3. A peripheral wall 4 extends around the periphery of connector 1. The peripheral wall 4 including a proximal portion, a distal portion, and opposing side portions that connect the proximal and distal portions, referred to as a first side 17 and a second side 18. A top surface 19 extends between opposing peripheral wall side portions. The top surface may also extend beyond the first and second sides of the peripheral wall 4 to form a ledge 20 that extends substantially along the longitudinal length of the connector 1 on each of the first 17 and second 18 sides (see FIG. 2). The top surface 19 may have a channel 21 with opposing channel side walls 21a, 21b and a bottom wall 21c running lengthwise (longitudinally) and extending from the proximal end 2 to the distal end 3 of the connector 1. Further, at or near the proximal end 2 of the connector 1, there may be a groove 22 with opposing groove walls 22a, 22b, extending from one of the side walls to the opposite side wall sized such that it is capable of accepting a trapezoid roller of a trapezoid roller style wiper arm. The top surface 19 may extend slightly outward into the groove 22 such that retaining flanges 24a, b, c, d are formed for holding a trapezoid roller of a trapezoid roller style wiper arm in place within the groove. There may also be channel indentions 34a, 34b on each side of the groove 22 for engaging roller appendages 33 to aid in holding the roller in place (see FIGS. 9A and 9B).

The opposing peripheral side walls may also each have a retaining pin aperture 23a, 23b aligned with one another and sized to be capable of accepting a retaining pin of at least one pin-type windshield wiper arm, such as a French pin style retaining pin. The retaining pin aperture 23a, 23b may also include a retaining pin lock structure 150a, 150b therein for locking retaining pins that are inserted into the apertures and holding them within the aperture structure. As illustrated, the channel bottom wall 21c may extend into the aperture space on each side of the aperture to form the retaining pin lock structure.

In some embodiments, the distal end of the channel 21 may have a pillar 25 extending upwards from the bottom wall 21c of the channel 21. The pillar 25 functions to engage a notch on the arm of a notched bayonet style wiper arm as it rests against the surface of the channel (see FIG. 13). Further, the opposing side channel walls 21a, 21b of the channel may each have one or more retaining appendages 26 extending a distance towards opposing side channel walls 21a, 21b. The retaining appendages 26 function to hold the wiper arm against the surface of the channel 21. The retaining appendages 26 are sized such that the wiper arm snaps into place as it is pressed towards the surface of the channel.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece. In addition, the connector 1 is configured such that the orientation of either the windshield wiper or the connector can be reversed based on the particular windshield wiper arm that is being used.

Figure 2:
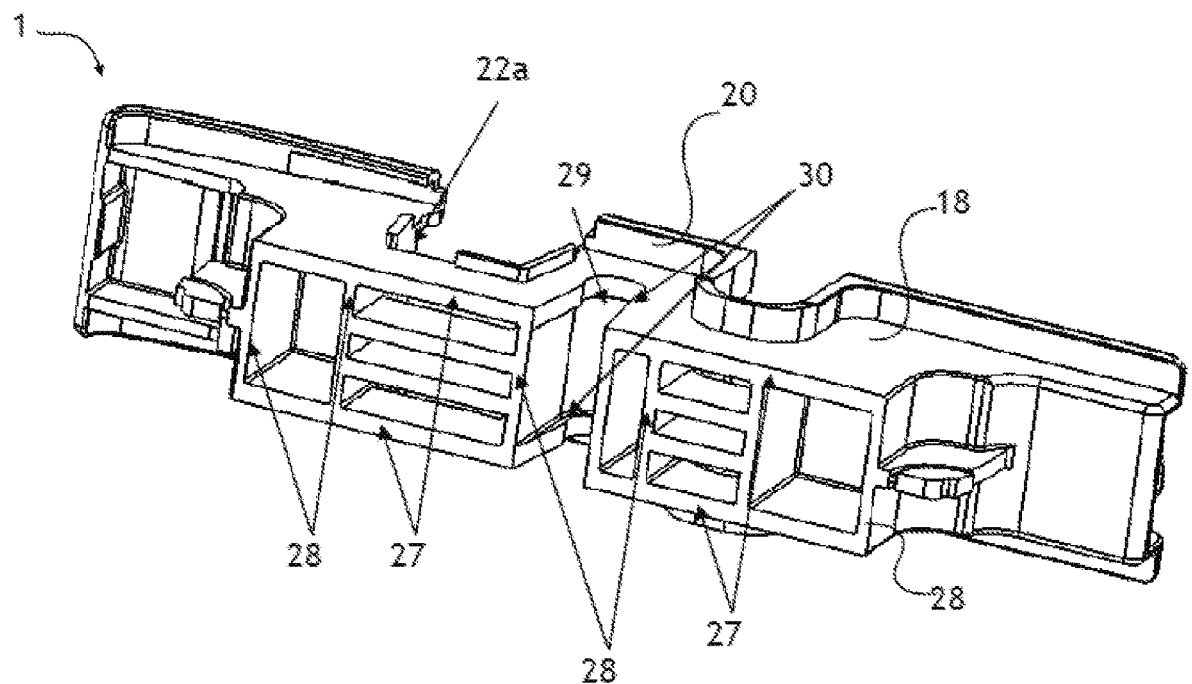
FIG. 2 is a bottom perspective view of an embodiment of the connector shown in FIG. 1 that illustrates the internal support structure on the underside of the connector.

FIG. 2 is a bottom perspective view of an embodiment of a connector 1 of the disclosure that illustrates the internal support structure inside the connector 1. In particular, internal support walls provide rigidity and structural strength to the connector 1. The support walls can extend substantially along the length of the connector continuously, or intermittently, having gaps along the way. In this embodiment, the connector may have at least one internal longitudinal support wall 27 extending downwards from the top surface and extending substantially along the longitudinal length of the connector 1 for providing rigidity and structural support for the connector. In some embodiments, the connector 1 may have at least one internal perpendicular support wall 28 extending downwards from the top surface and extending substantially from the one side wall of the connector 1 to the opposing side wall.

In some embodiments, the connector 1 may have at least one rivet passage 29 and arcuate rivet clip 30 a, b in each of the side walls 17, 18 for accepting and securing a rivet of a wiper blade, thereby securing the connector 1 to the wiper blade. In some of these embodiments, the connector 1 may be capable of being secured to the mounting base of a windshield wiper blade assembly via the rivet through the mounting base.

Figure 3:
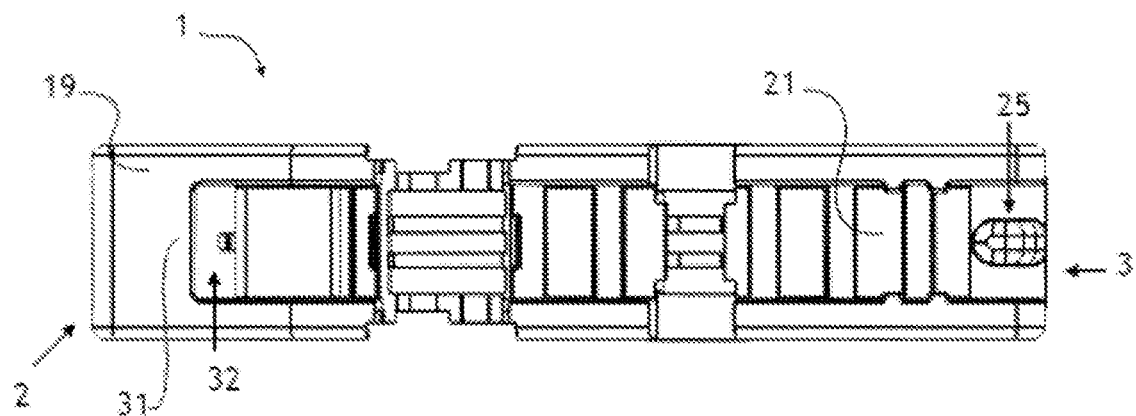
FIG. 3 is a top view of the connector shown in FIG. 1.

FIG. 3 is a top view of an embodiment of a connector 1 of the disclosure that illustrates the top surface 19 of the connector 1 may further have a proximal shelf 31 with an opening 32 underneath the proximal shelf that is sized to receive the end of a bayonet style arm. The bottom side of a bayonet style arm further rests against the bottom wall 21c of the channel 21 running lengthwise along the connector 1. The end of the arm would thus seat into the opening 32 and wedge against the underside of the proximal shelf 31. The channel 21 extends to the distal end of the connector wherein the arm extends therefrom when properly engaged with the connector 1.

Figure 4:
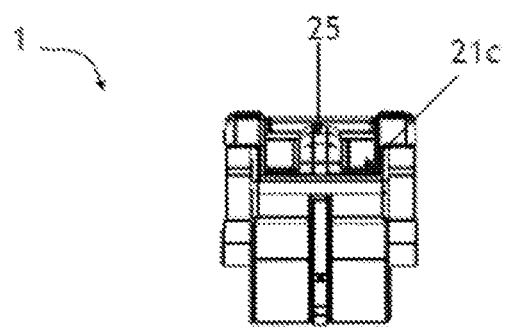
FIG. 4 is distal end view of an embodiment of a connector of the disclosure.

FIG. 4 is a distal end view of an embodiment of the connector 1 that illustrates the distal end 3. Also shown on this view is the pillar 25 extending upwards from the bottom wall 21c of the channel 21. Those skilled in the art will recognize that the shape of distal end 2 can vary so long as it does not interfere with attachment of the connector 1 to the wiper arm.

Figure 5:
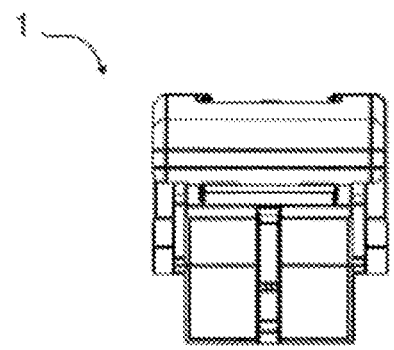
FIG. 5 is proximal end view of an embodiment of a connector of the disclosure.

FIG. 5 is a proximal end view of an embodiment of the connector 1 that illustrates the proximal end 2. Those skilled in the art will recognize that the shape of proximal end 2 can vary so long as it does not interfere with attachment of the connector 1 to the wiper arm.

Figure 6:
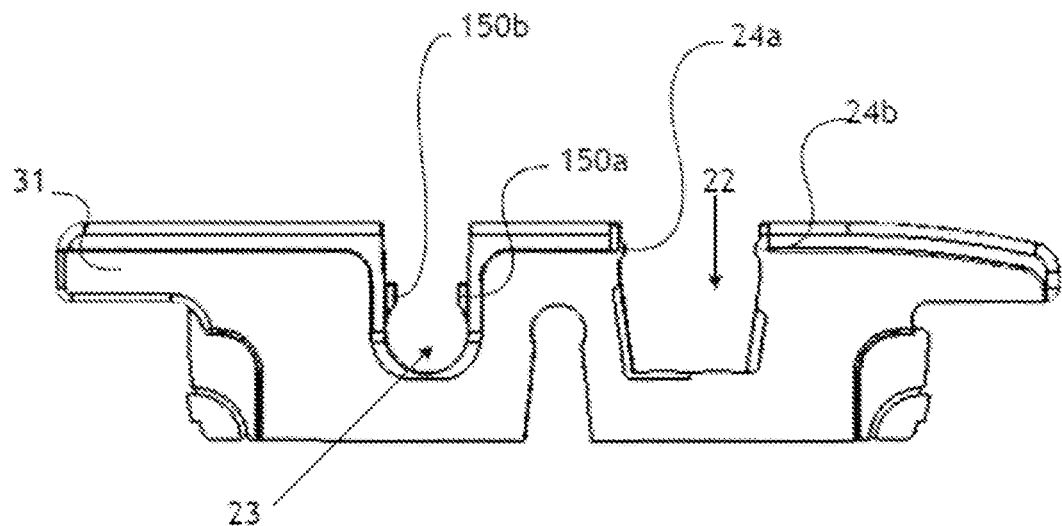
FIG. 6 is side view of an embodiment of a connector of the disclosure.

FIG. 6 is a side view of an embodiment of the connector 1 that illustrates the retaining pin aperture 23 and the retaining pin lock structure 150a, 150b therein for locking retaining pins that are inserted into the apertures and holding them within the aperture structure. The retaining flanges 24a, b are also illustrated for holding a trapezoid roller of a trapezoid roller style wiper arm in place within the groove 22.

Figure 7:
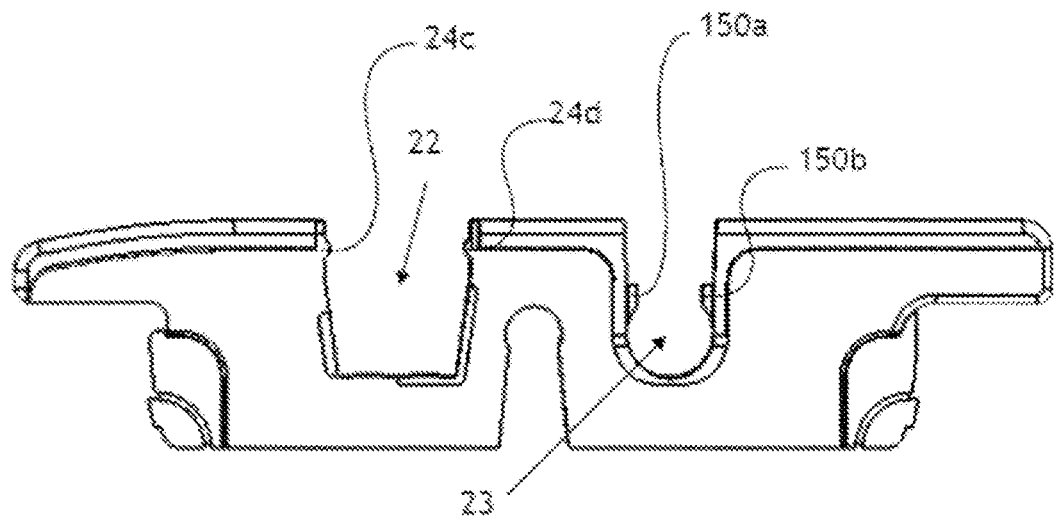
FIG. 7 is an opposing side view of the embodiment of the connector of the disclosure shown in FIG. 6.

FIG. 7 is an opposite side view of the embodiments of the connector 1 illustrated in FIG. 6. FIG. 7 illustrates the retaining pin aperture 23 and the retaining pin lock structure 150a, 150b therein. The retaining flanges 24c, d are also illustrated within the groove 22.

Figure 8:
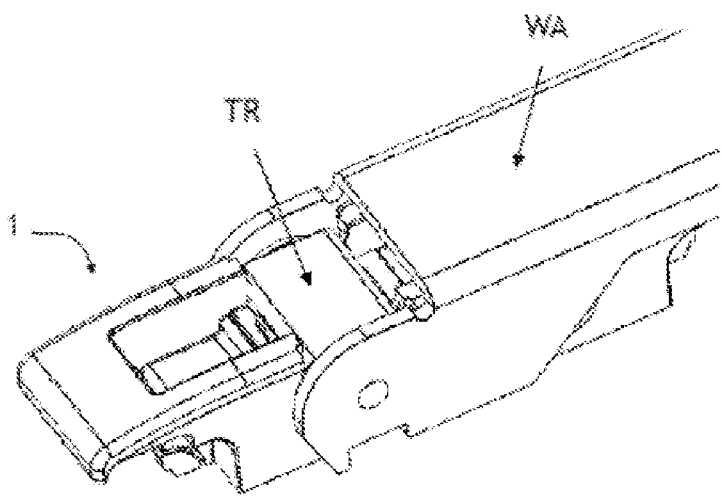
FIG. 8 is a top perspective view of a prior art wiper arm having a trapezoidal roller as connected to a connector of the disclosure.
Figure 9A:
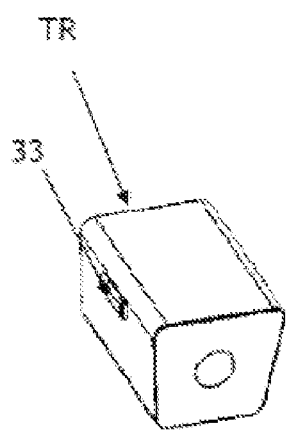
FIG. 9A is a top, front perspective view of a trapezoidal roller for a wiper arm.
Figure 9B:
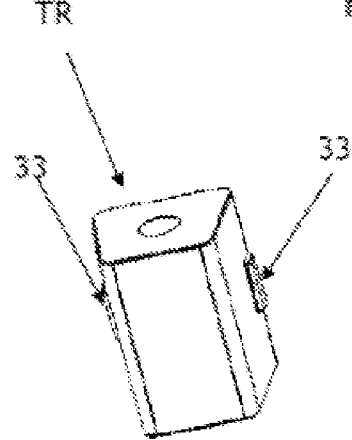
FIG. 9B is a bottom, front perspective view of the trapezoidal roller for a wiper arm shown in FIG. 9A.
Figure 10:
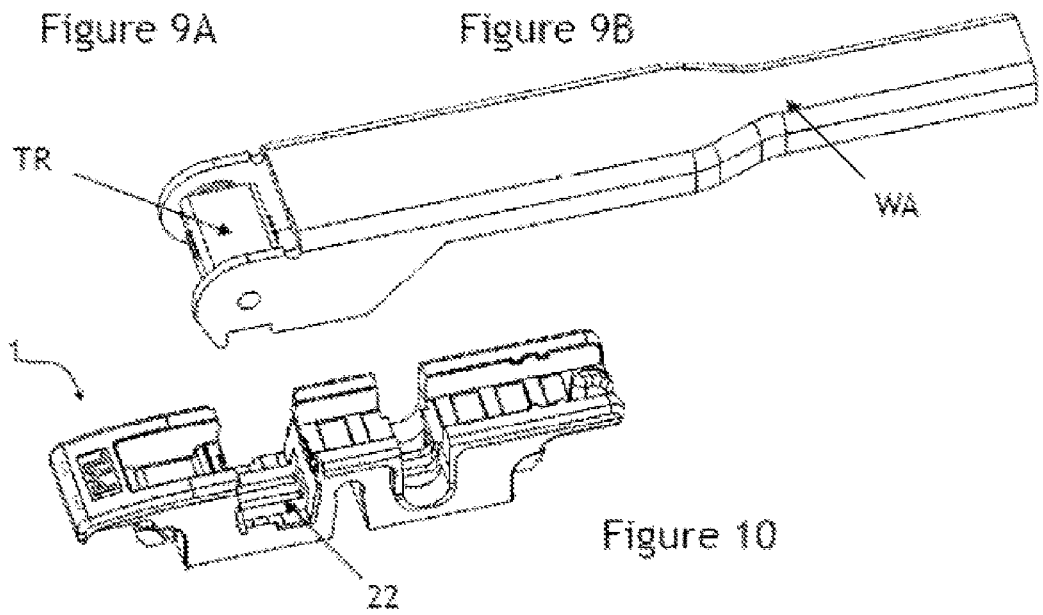
FIG. 10 is a top perspective view of a prior art wiper arm having a trapezoidal roller prior to being connected to a connector of the disclosure.

FIG. 8 illustrates an embodiment of a connector 1 of the disclosure connected to a windshield wiper arm in one of several possible configurations. As shown, the trapezoid roller TR of a trapezoid roller style wiper arm (WA) is in place within the groove 22 of the connector 1. FIGS. 9A and 9B illustrate a type of trapezoid roller that may be on a wiper arm (shown unattached to the wiper arm for illustrative purposes). As shown, the rollers may have side appendages 33 for engaging the channel indentions 34a, 34b on each side of the groove 22. FIG. 10 illustrates the connector and wiper arm shown in FIG. 8 before attachment. The shaft of the wiper arm rests against the top surface 19 of the connector 1 when the roller is attached to the groove 22 of the connector 1.

Figures 11A, 11B:
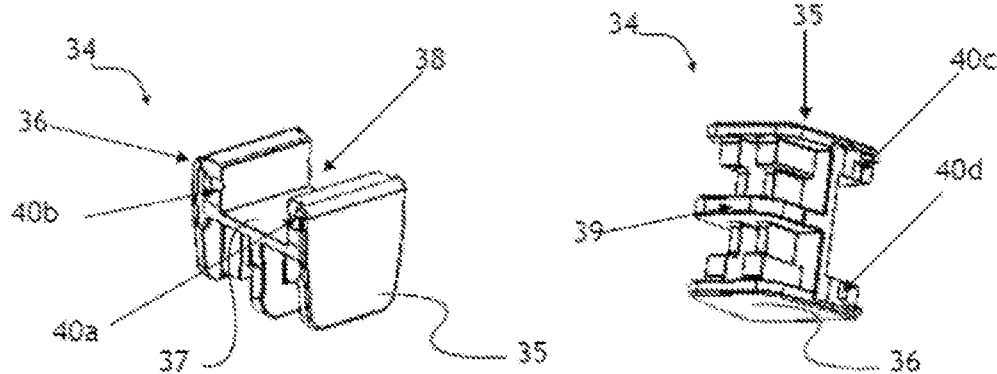
FIG. 11A is a perspective view of a groove cover for a connector of the disclosure.
FIG. 11B is a bottom perspective view of the groove cover shown in FIG. 11A.
Figure 12:
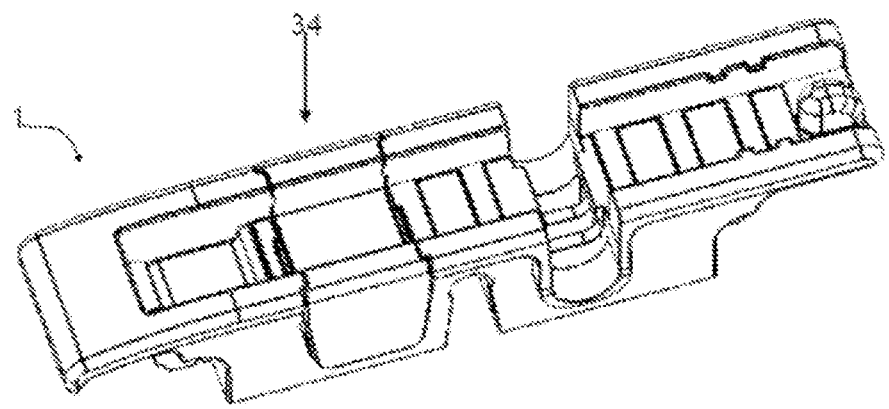
FIG. 12 is a perspective view of a connector of the disclosure with a groove cover attached thereto.

FIGS. 11A and 11B illustrate a groove cover 34 that may be utilized to cover the groove 22 of the connector 1 when wiper arms other than a trapezoid roller style wiper arm is being utilized with the connector. The groove cover 34 comprises a groove cover first side 35 and a groove cover second side 36 with a groove cover top wall 37 connecting the two side walls such that a groove cover channel 38 is formed between the two side walls. As shown in FIG. 11B, the underside of the groove cover 34 comprises one or more support structures 39. As also illustrated in FIGS. 11A and 11B, the groove cover 34 may also have groove cover notches 40a, b, c, d on each end of the side walls which are configured to engage the retaining flanges 24a, b, c, d extending into the space of the groove 22 to lock (i.e., snap) the groove cover 34 into place. FIG. 12 illustrates a connector 1 of the disclosure with a groove cover 34 in place. As shown, the groove cover is shaped to complement and match the configuration of the connector side walls and channel and substantially hides the groove 22.

Figure 13:
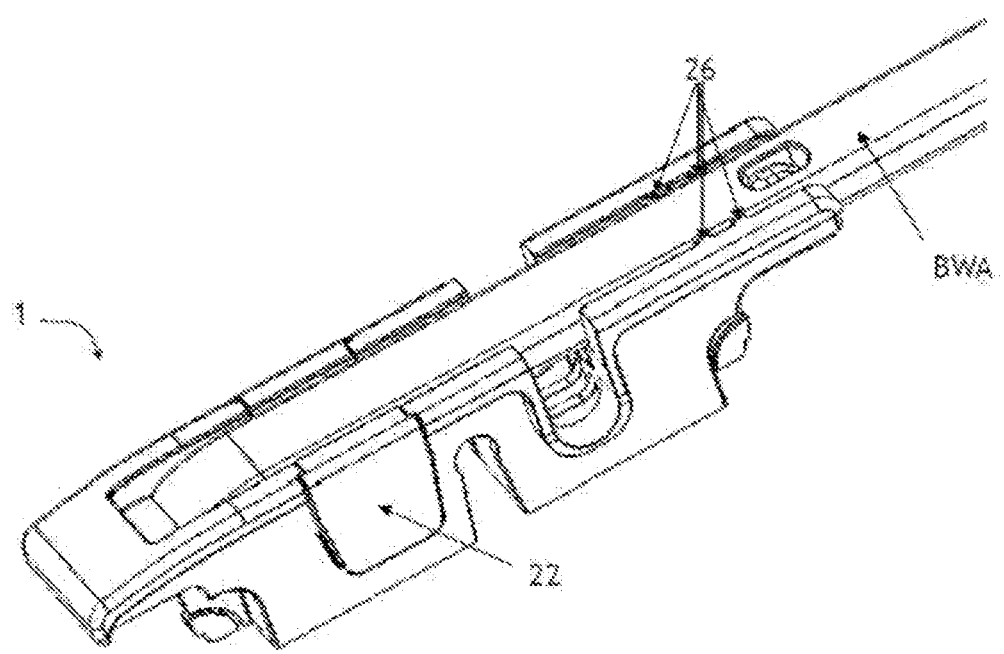
FIG. 13 is a top perspective view of a prior art notched bayonet style wiper arm as connected to a connector of the disclosure.
Figure 14:
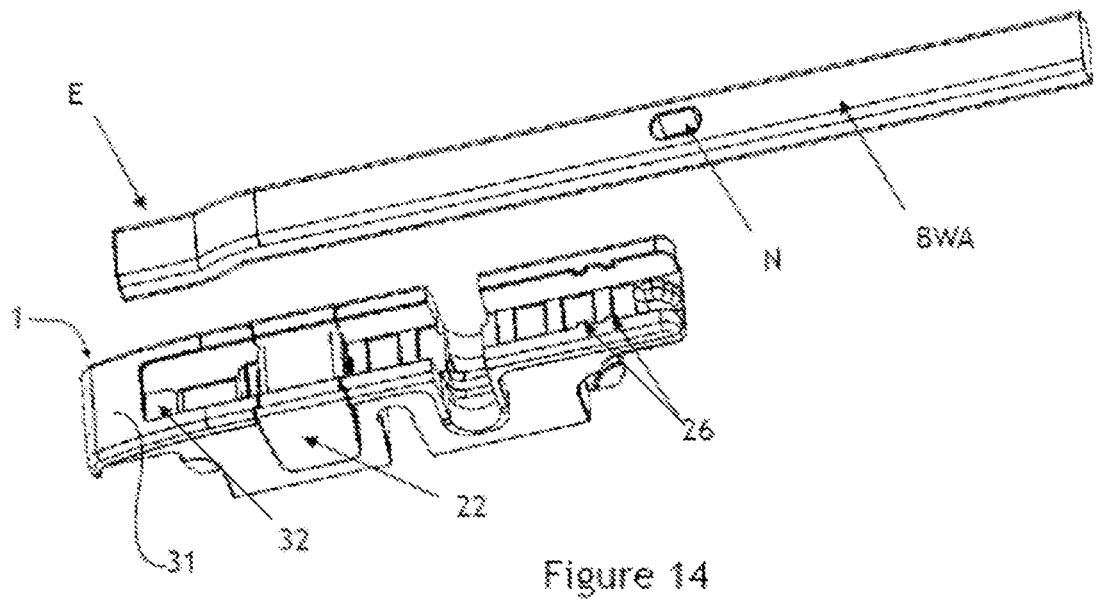
FIG. 14 is a top perspective view of a prior art notched bayonet style wiper arm prior to being connected to a connector of the disclosure.

FIG. 13 illustrates a notched bayonet style wiper arm (BWA) as attached to a connector 1 of the disclosure. The wiper arm BWA prior to attachment with the connector 1 is shown in FIG. 14. As shown, the connector 1 has a groove cover 34 in place; however, one skilled in the art would recognize that the groove cover 34 could be absent from the connector 1. The pillar 25 of the connector 1 slides into the notch N of the wiper arm BWA when the wiper arm BWA is properly seated into the connector 1. The end E of the wiper arm BWA slides into the opening 32 underneath the proximal shelf 31 that is sized to receive the end E of a bayonet style arm such that the end E now rests underneath and against the proximal shelf 31. The one or more retaining appendages 26 snap the arm into place and help to retain the position of the arm within the channel 21 of the connector 1.

Figure 15:
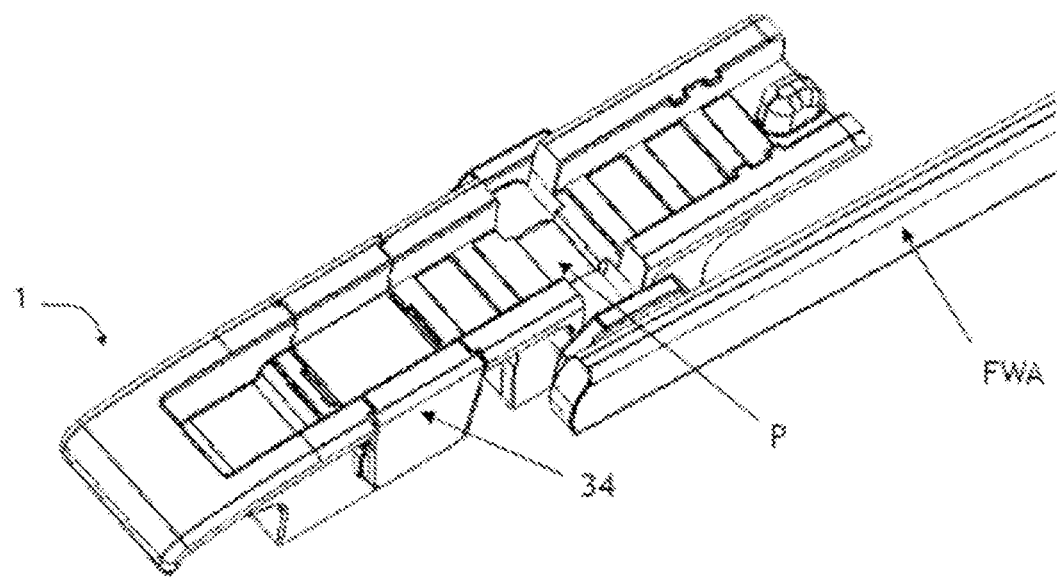
FIG. 15 is a top perspective view of a prior art pin style wiper arm as connected to a connector of the disclosure.
Figure 16:
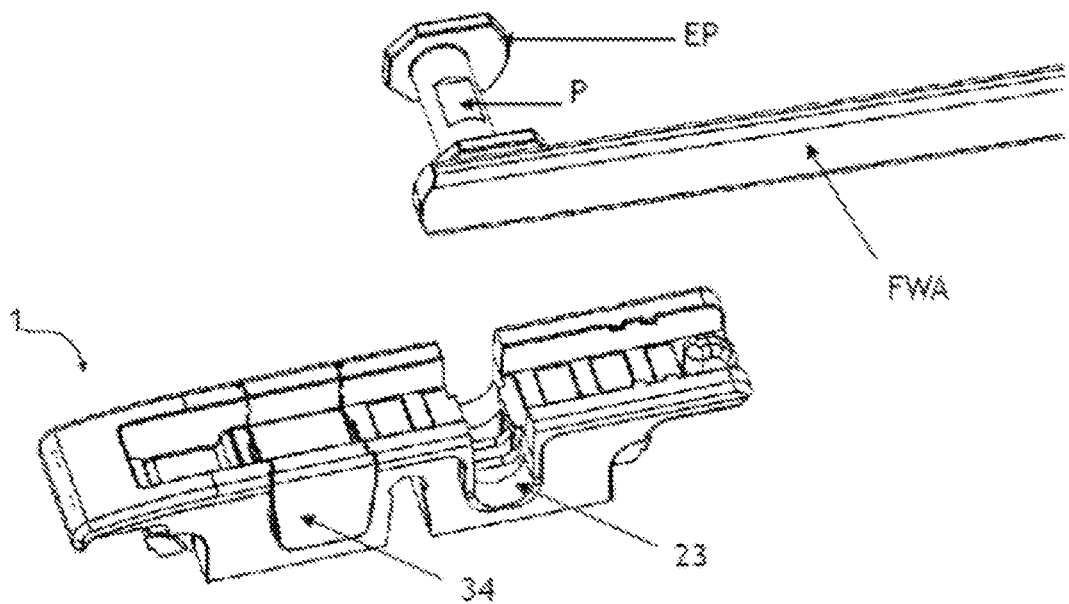
FIG. 16 is a top perspective view of a prior art pin style wiper arm prior to being connected to a connector of the disclosure.

FIG. 15 illustrates a French pin style wiper arm (FWA) as attached to a connector 1 of the disclosure. The wiper arm FWA prior to attachment with the connector 1 is shown in FIG. 16. As shown, the connector 1 has a groove cover 34 in place; however, one skilled in the art would recognize that the groove cover 34 could be absent from the connector 1. The retaining pin P of the wiper arm FWA engages the retaining pin aperture 23. The retaining flanges 24 within the aperture helps to lock (i.e., snap) the retaining pin P into place. The retaining pin P may also have an end plate EP that prevents the pin P from sliding out of the retaining pin aperture 23 when seated therein. It is also contemplated that the connector 1 of the present disclosure could be utilized with a retaining pin that does not have an end plate EP. For instance, a retaining pin P with varying diameters thereon creating an edge that the retaining flanges 24 may rest against and function to prevent the retaining pin P from being released from the connector 1.

As show be appreciated at least from FIGS. 8, 10, 13, 14, 15 and 16, the same connector 1 can be used with differing windshield wiper arms, namely a bayonet style arm, a pin style arm, and a trapezoidal roller style of arm. This allows a reduced inventory that can satisfy the needs of a larger number of windshield wiper arm types.

FIGS. 18 through 45 illustrates an additional connector 100 embodiment that can also be used a bayonet style arm, a pin style arm, and a trapezoidal roller style of arm. A connector 100 has a proximal end 102 and a longitudinally opposed distal end 103 in addition to a lateral first side 117 and laterally opposing second side 118 as well as a top side 119 and an opposed bottom side 120. An attachable cap 130 and adapter 150 may also be utilized as part of connector 100 as described herein.

With reference to FIGS. 18 through 28, a connector 100 may include peripheral side walls 104 provided on the first and second sides 117, 118 of the connector. A ledge 105 may be defined at the top side 119 of each of the side walls 104. A longitudinal wiper arm channel 106 may be defined between side walls 104 on the top side 119 of the connector. The interior surfaces of the side walls 104 may include retaining appendages or resilient channel tabs 110 projecting into the channel 106. A pillar 114 may be project upwards from the channel 106 at or near the distal end 103. Channel 106 may generally extend from distal end 103 to an overhang 107 at the proximal end 102. The overhang 107 may include a top surface 108 extending between the side walls 104 over the proximal end of channel 106. Overhang 107 may also include a window 108. This proximal end area including the overhang may also be generally referred to as the cap portion of the connector as the cap is connected in this area and further described herein.

A groove 109 may be provided in channel 106 between overhang 107 and the proximal end 103. Groove 109 may include a gap or break in side walls 104 such that there are lateral openings in the groove. The top surface of the channel at gap 109 may also be recessed as compared to the top surface of the channel near the distal side 103 of the connector. The ledges 105a adjacent to the gap may also be elevated further away from the top surface of the channel as compared to the ledges 105 along the majority of channel 106. Groove walls 109a, 109b may be defined as the edges of the sidewalls proximate groove 109. Groove walls 109a, 109b may project upwards from the top surface of groove 109 at a slight angle away from one another so as to accommodate a trapezoidal shaped connector of a wiper arm, as further described herein.

Referring now to FIGS. 19, 21, and 29-35, a cap 130 may be connected in the cap portion of the connector at the proximal end 102. Cap 130 may include a top cap wall 131 and a pair of opposing cap side walls 132. Cap pivot holes 111 may be provided on side walls 104 proximate overhang 107, and the interior surface of the cap side walls 132 may include cap pivot projections 133 for engaging the pivot holes. With the cap pivot projections 133 inserted into pivot holes 111, the cap is attached to connector 100 and cap 130 is pivotable about a pivot axis defined as extending through the pivot holes 111. Cap side walls may also include cap securing projections 134 also provided on the interior surface of the cap side walls 132. Cap securing projections 134 may engage with securing holes 112 also provided on the side walls 104. As the cap 130 is pivoted or rotated down towards the channel 106, the cap securing projections 134 may be inserted into securing holes 112 thereby securing cap 130 in a closed or secured position. Side walls 104 may include securing slopes 113 proximate securing holes 112 so as to guide or urge a gentler engagement of securing projections 134 into securing holes 112 as the cap is rotated into its closed position. An underside cap surface 135 on the top cap wall 131 may contact side wall edges 105 proximate groove 109, and the top cap wall 131 may extend over groove 109 thereby covering the top side 119 of groove 109.

With reference now to FIGS. 18 through 21 and 36 through 42, an adapter 150 may generally include a groove insert 151, a central platform 152, and a tail 153. Groove insert 151 may include a pin passage 154 with a trapezoidal shaped outer surface 155 conforming dimensioned with groove walls 109a, 109b. Adapter 150 may be secured with connector 100 by inserting, and snap or friction fitting, groove insert 151 into groove 109. Pin passage 154 may be a clip and open on the top side 119 in order to receive a pin from a wiper arm at the top side as described herein. Pin passage 154 may also be open on the lateral sides 117, 118 so as to permit a pin from a wiper arm to pass therethrough, as also described herein.

A central platform 152 may be connected to groove insert 151 by a platform bridge 156, which may have a narrower lateral width as compared to central platform 152 so that elevated ledges 105 can be positioned laterally adjacent the platform bridge. A handle 157 may be provided on a lateral edge of adapter 150, with one longitudinal end of the handle attached to the bridge 156 while the other opposing longitudinal end of the handle is attached to the central platform 152. A generally "L" shaped space or gap may be defined by the handle. The handle 157 may project laterally beyond the side walls 104 when the adapter is connected with the groove 109. Central platform 152 may also have underside projections 158 that contact ledge 105. Underside projections 158 may project a distance equivalent to the height difference between ledge 105 and elevated ledge 105a so that platform 152 is about on the same plane as elevated ledge 105a. Additionally, a tail 153 may project longitudinally away from central platform 152. The tail 153 may be connected to the underside of the platform 152 so that it sits at an elevation below the platform that is equal with the edge of the underside projections 158. When the adapter is connected, the tail may be positioned within channel 106 and have a friction or snap fit engagement with the resilient tabs 110 in the channel. Tail 153 may also include longitudinal ribs 159 extending across a portion of the longitudinal length of the tail and projecting upwards towards the top side 119. Two such longitudinal ribs 158 are shown in the illustrated embodiment. A pillar hole 160 may also be provided on the tail 153 so as to permit passage of pillar 114 thereby preventing interference by pillar 114 as adapter 150 is connected.

Figure 43:
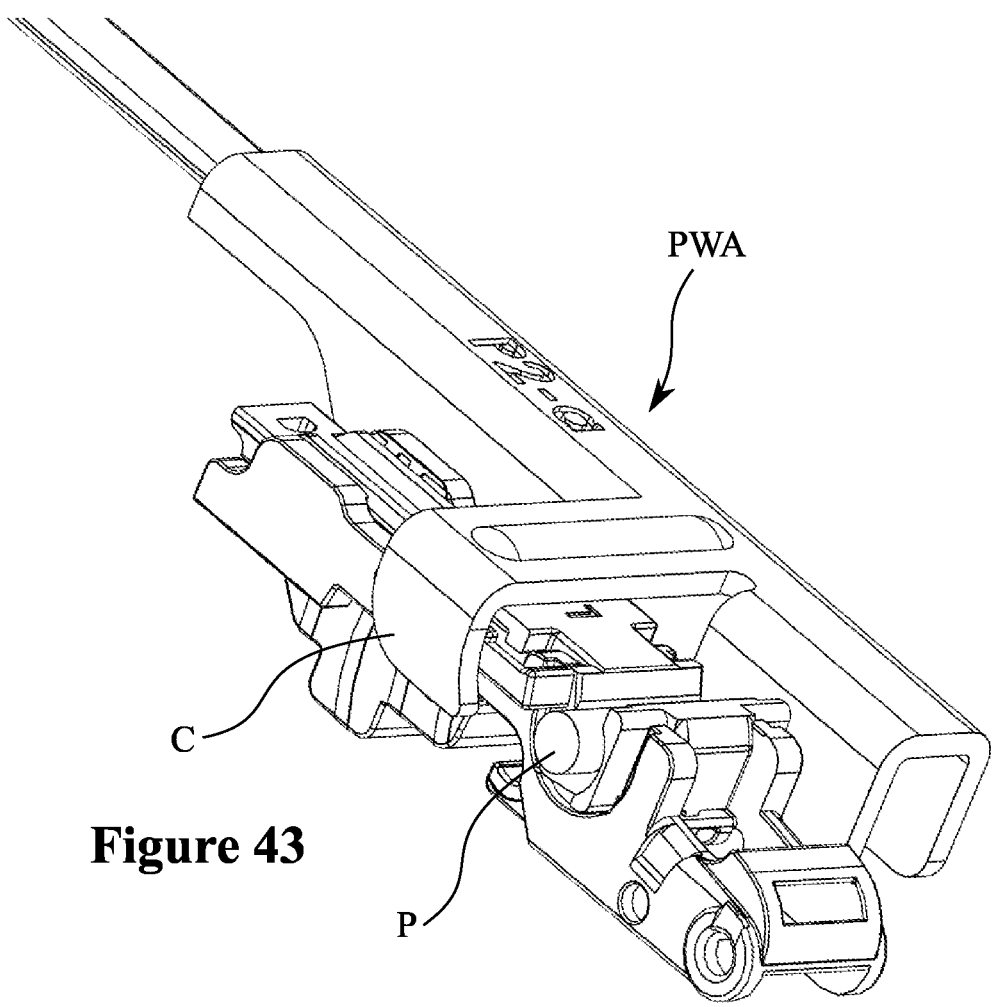
FIG. 43 is a perspective view of the connector of FIG. 18, illustrated without a cap, connected with a prior art pin-type wiper arm.
Figure 44:
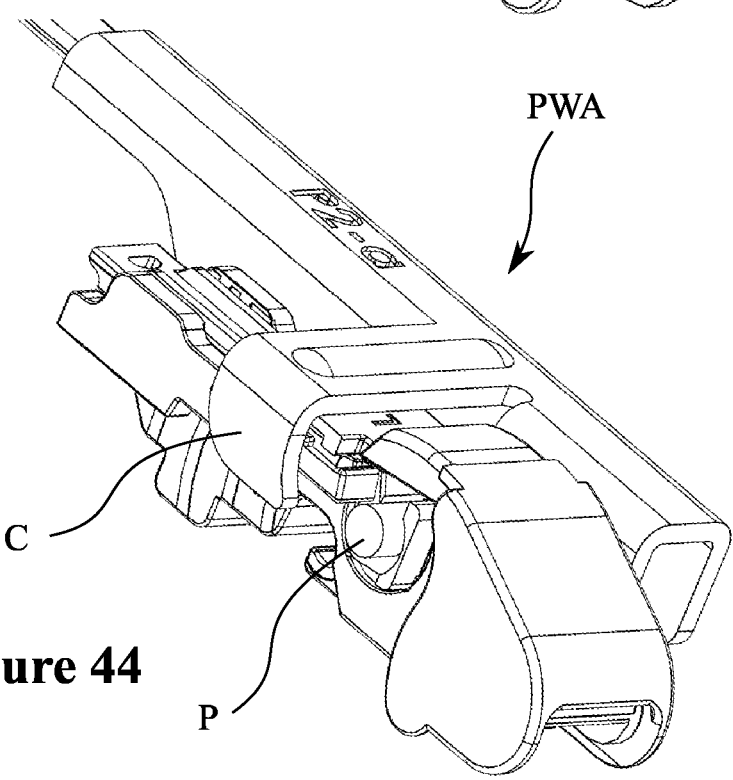
FIG. 44 is a perspective view of the connector of FIG. 18 connected with a prior art pin-type wiper arm.
Figure 49:
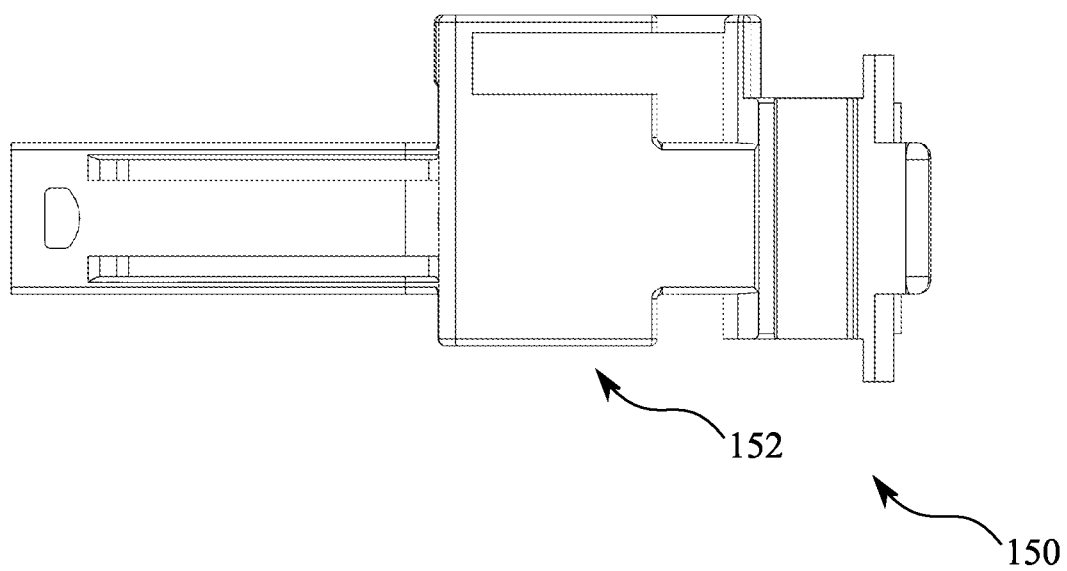
FIG. 49 is a top view of an embodiment of an adapter.

FIGS. 43 and 44 show connector 100 secured to a pin-type wiper arm PWA known in the prior art. This pin-type wiper arm PWA includes a pin P and a laterally projecting clip C. The pin P is engaged with pin passage 154 of adapter 150, while projecting clip C snaps around and under handle 157. It should be appreciated that the disclosure contemplates that adapter 150 may be mirrored to accommodate either inward or outward facing pins P and clips C. The illustrated embodiment shows a left side adapter 150. A right side adapter 150 is shown FIG. 49 where the central platform 152 laterally projects to the opposite side as what is shown in the figures.

Figure 45:
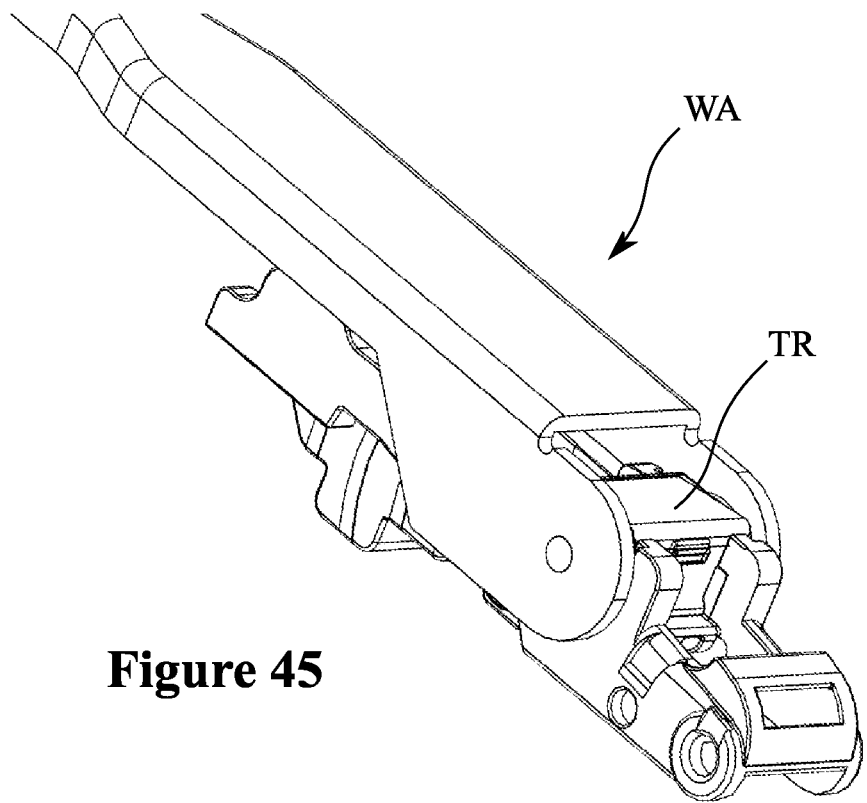
FIG. 45 is a perspective view of the connector of FIG. 18, illustrated without a cap and without an adapter, connected with a prior art wiper arm having a trapezoidal roller.
Figure 46:
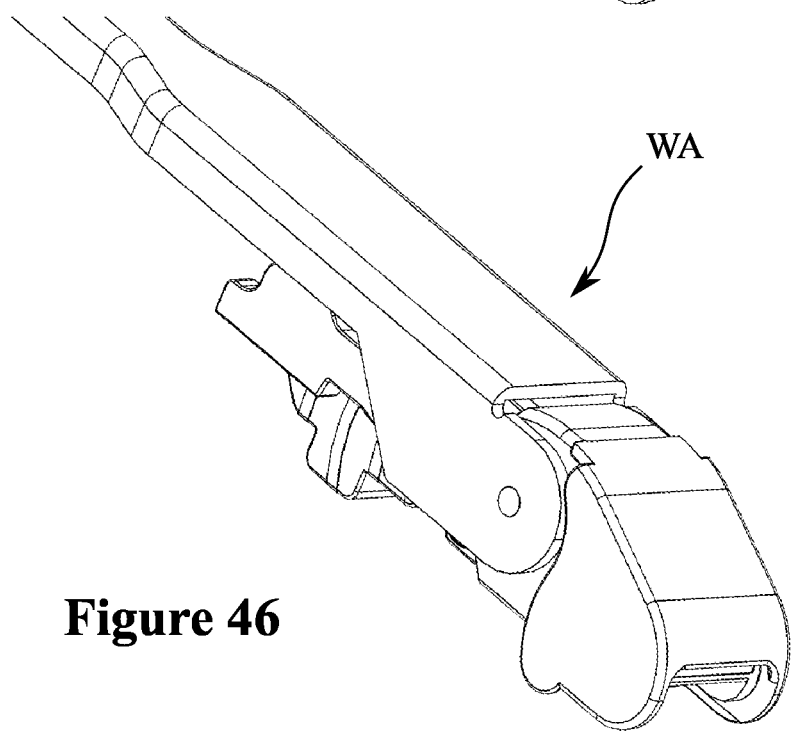
FIG. 46 is a perspective view of the connector of FIG. 18, illustrated without an adapter, connected with a prior art wiper arm having a trapezoidal roller.

FIGS. 45 and 46 show connector 100 secured to a trapezoidal roller style wiper arm WA. The trapezoidal roller TR of the wiper arm WA is snap fit insertable within groove 109. The top cap wall 131 extends over groove 109 and the inserted trapezoidal roller TR, while avoiding contact with wiper arm WA.

Figure 47:
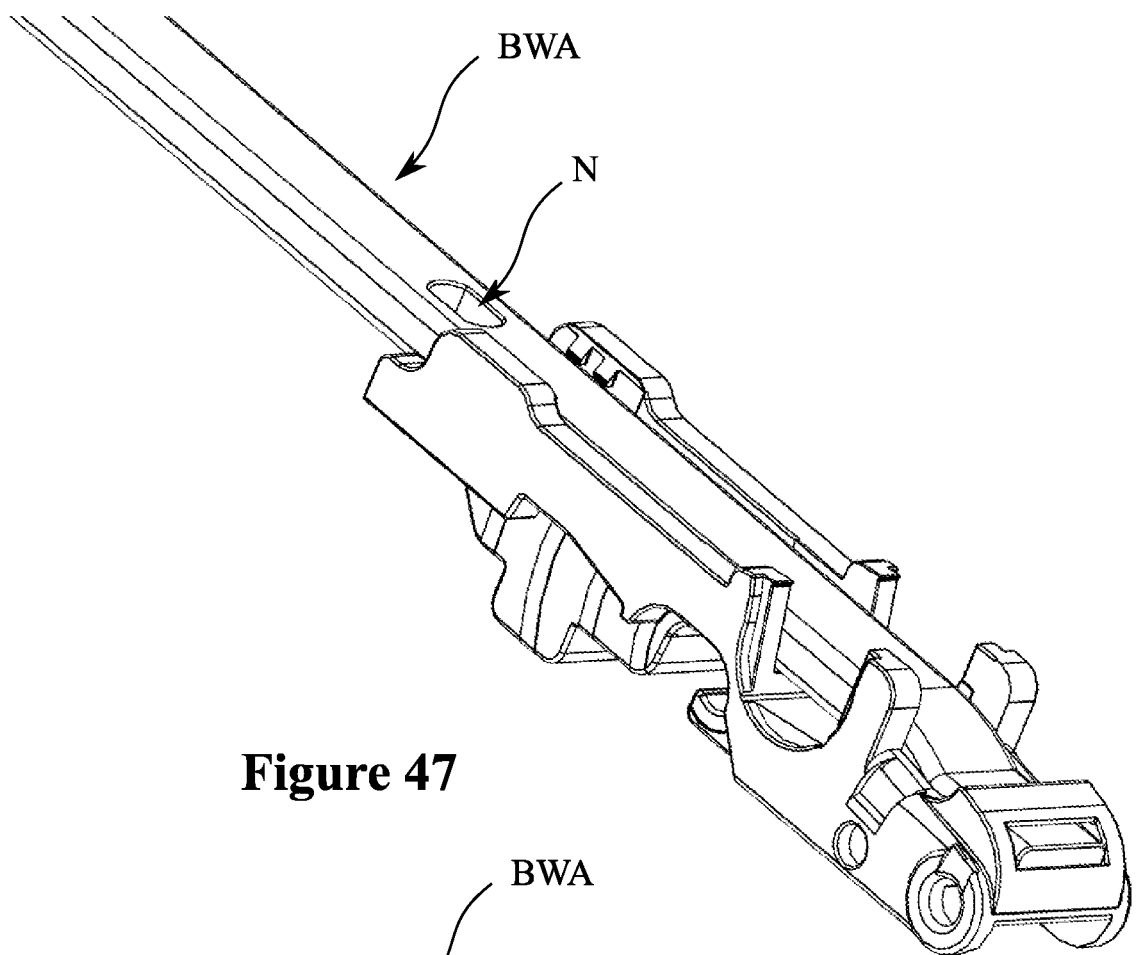
FIG. 47 is a perspective view of the connector of FIG. 18, illustrated without a cap and without an adapter, connected with a prior art wiper notched bayonet style wiper arm.
Figure 48:
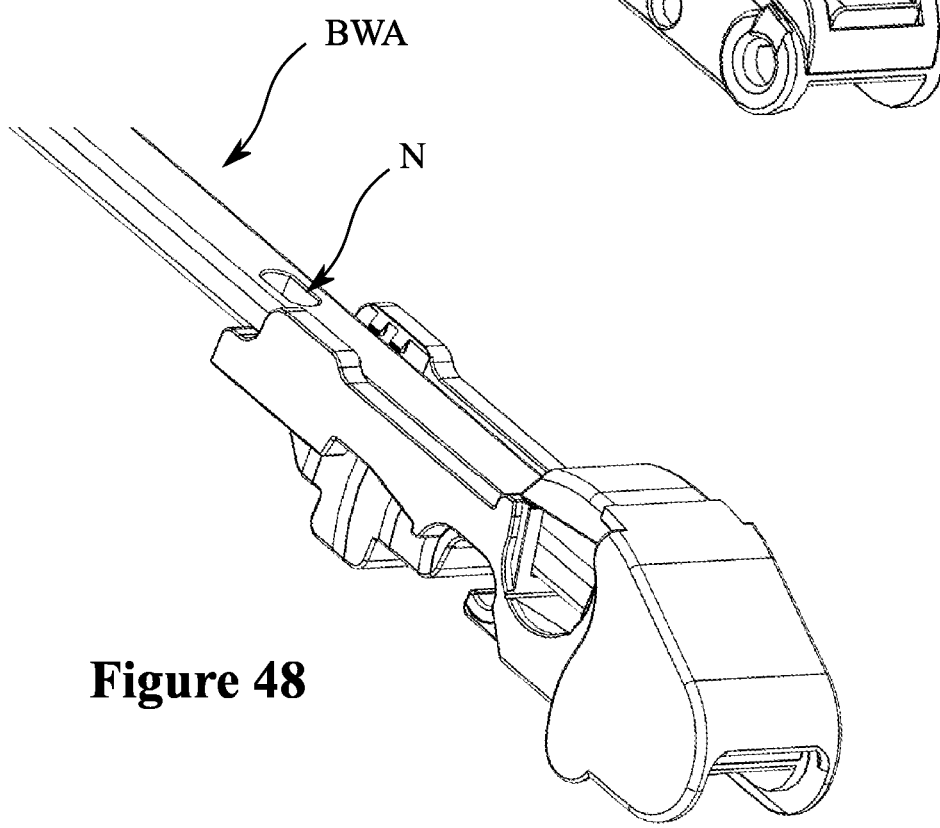
FIG. 48 is a perspective view of the connector of FIG. 18, illustrated without an adapter, connected with a prior art notched bayonet style wiper arm.

FIGS. 47 and 48 show connector 100 secured to a bayonet style wiper arm BWA. An end of wiper arm BWA may be positioned under overhang 107 and into window 108. Resilient projections 110 may further secure wiper arm BWA with channel 106. Additionally, pillar 114 may engage with a notch N in wiper arm BWA.

In operation, embodiments of the windshield wiper connector 1, 100 disclosed allows a single windshield wiper to be used in conjunction with a wide variety of windshield wiper arms. This reduces manufacturing cost, inventory cost, and provides for easy replacement of windshield wipers as needed.

In certain embodiments, the connector 1, 100 may be connected to the wiper blade prior to connecting to the wiper arm. In certain embodiments, the connector 1, 100 may be connected to the wiper arm prior to being connected to the wiper blade. In certain embodiments, the connector 1, 100 may either be first connected to the wiper arm or to the wiper arm.

Figure 17:
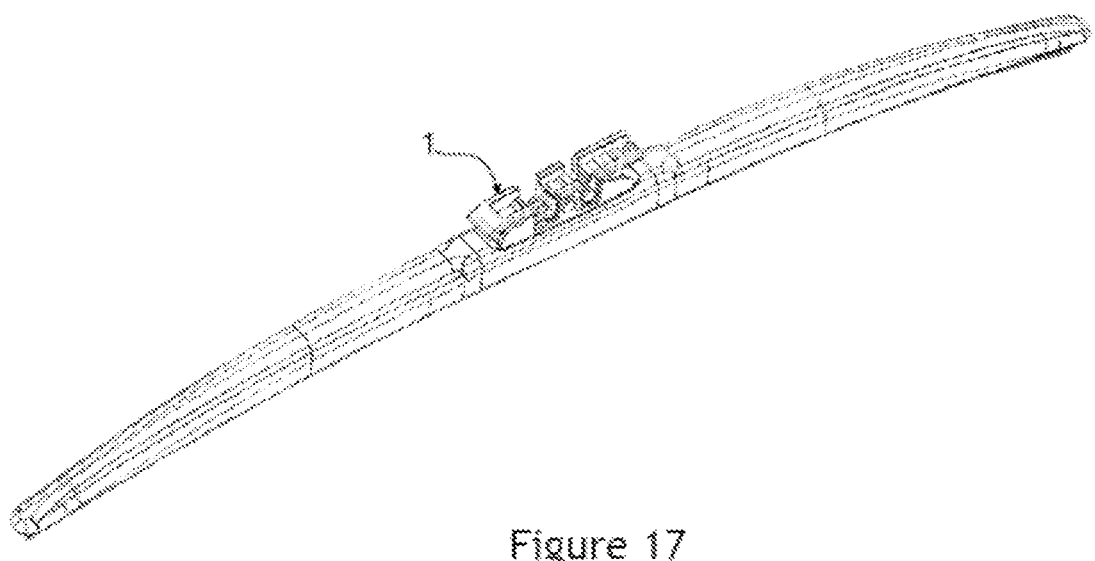
FIG. 17 is a connector of the disclosure connected to a wiper blade.
Figure 18:
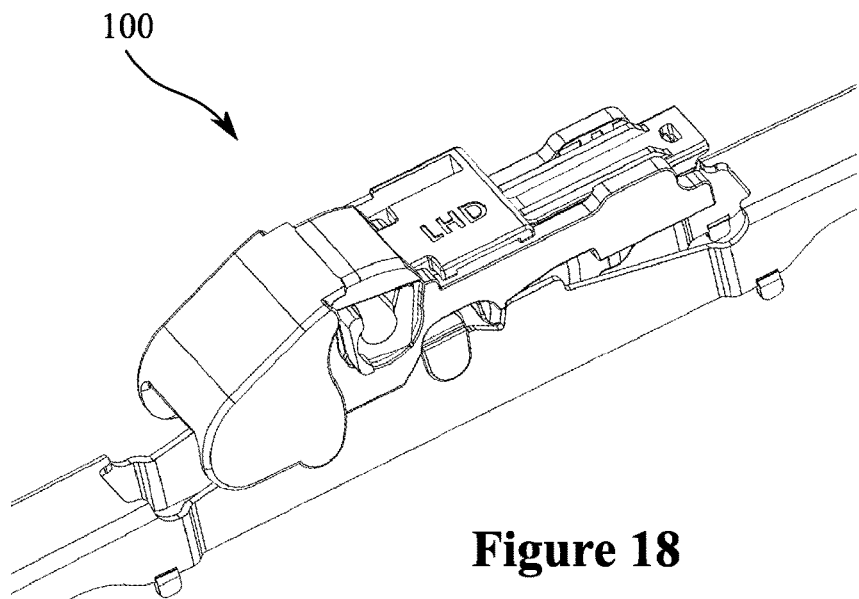
FIG. 18 is a top perspective view of a connector of the disclosure connected to a wiper blade.
Figure 19:
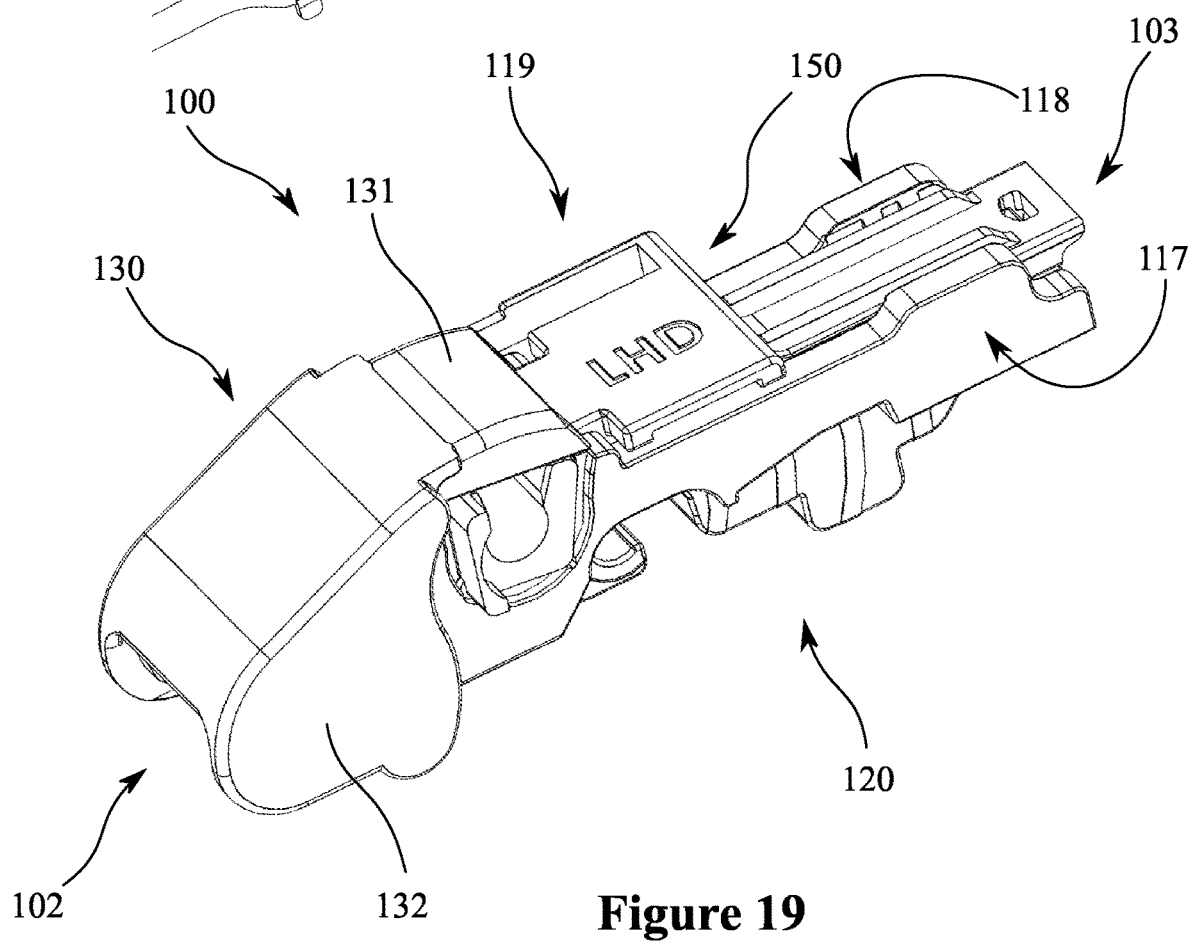
FIG. 19 is a top perspective view of the connector of FIG. 18.
Figure 20:
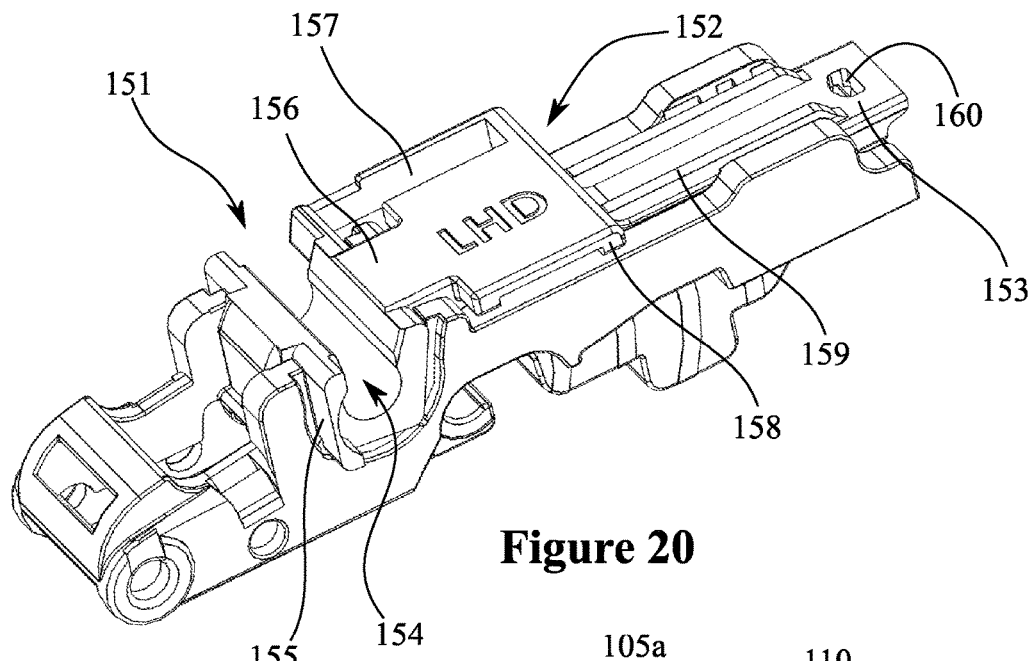
FIG. 20 is a top perspective view of the connector of FIG. 18 without a cap.
Figure 21:
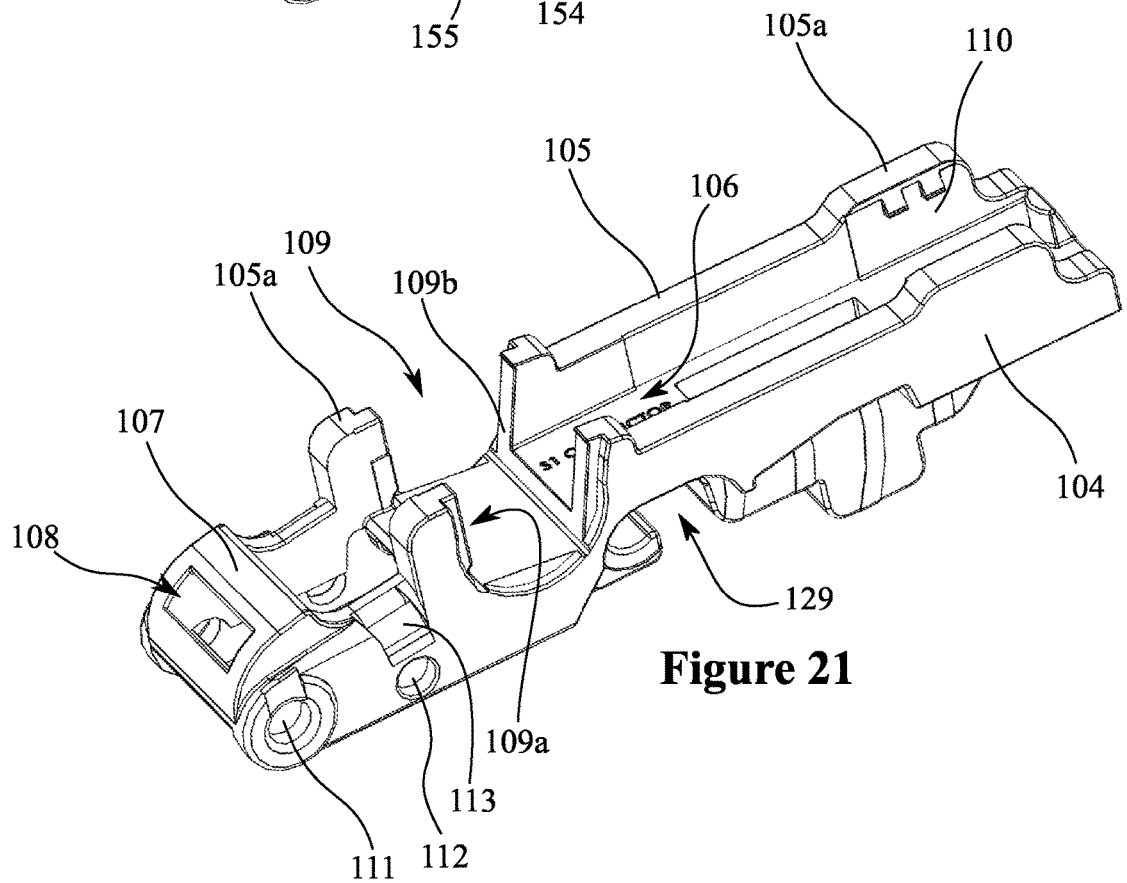
FIG. 21 is a top perspective view of the connector of FIG. 18 without a cap and without an adapter.
Figure 27:
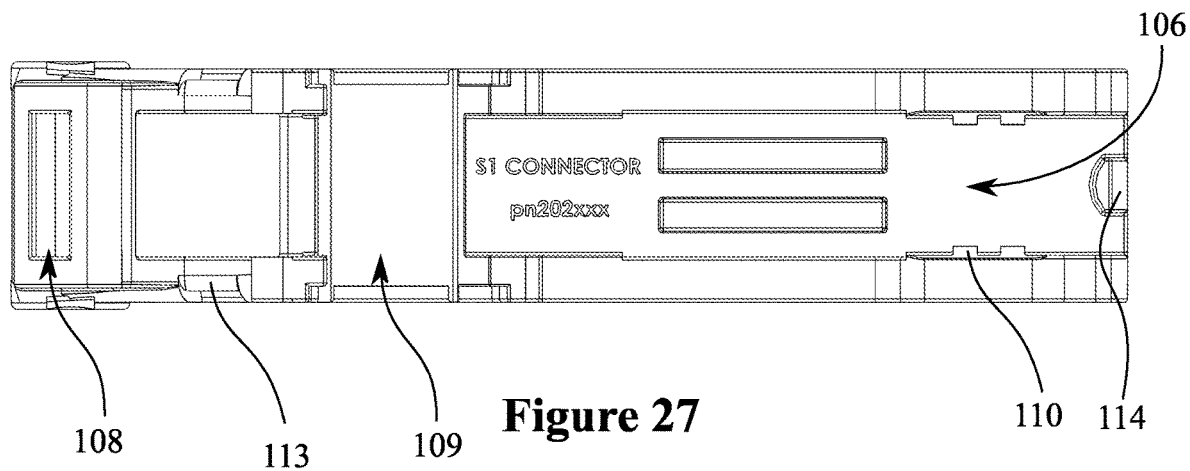
FIG. 27 is a top view of the connector of FIG. 18 without a cap and without an adapter.
Figure 28:
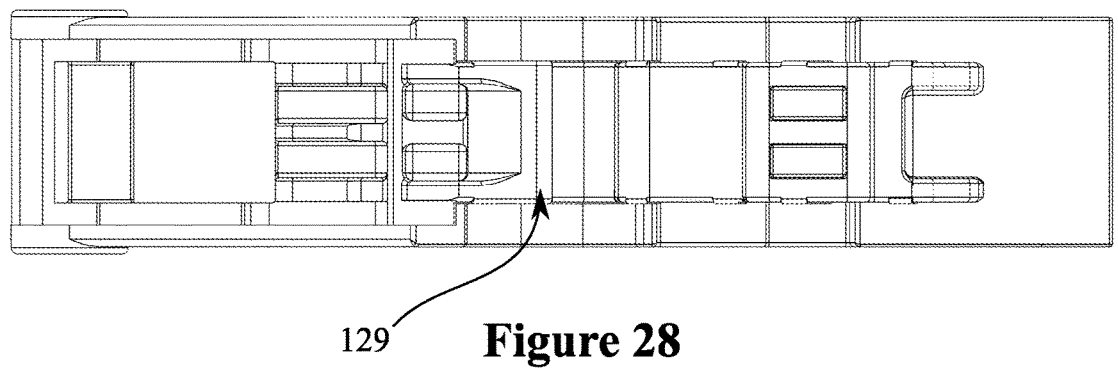
FIG. 28 is a bottom view of the connector of FIG. 18 without a cap and without an adapter.
Figure 29:
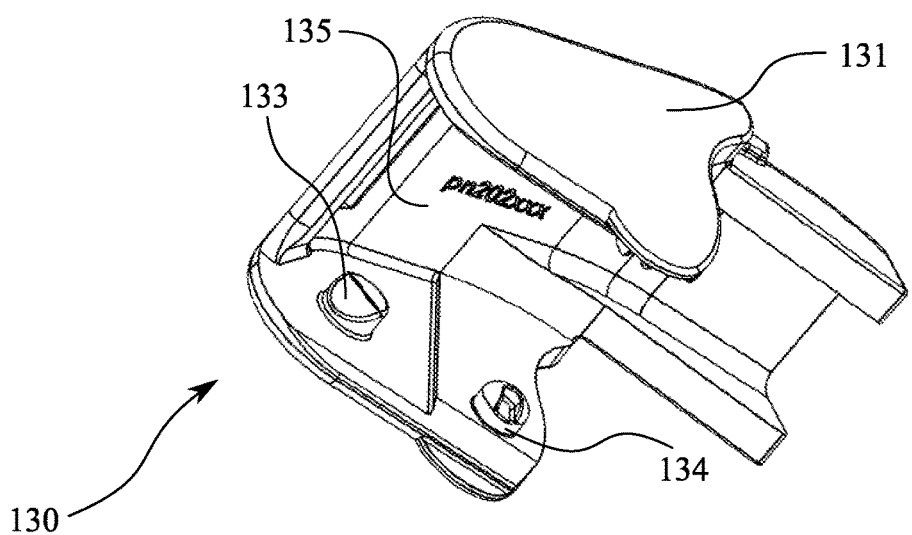
FIG. 29 is a bottom perspective view of the cap of the connector of FIG. 18.
Figure 36:
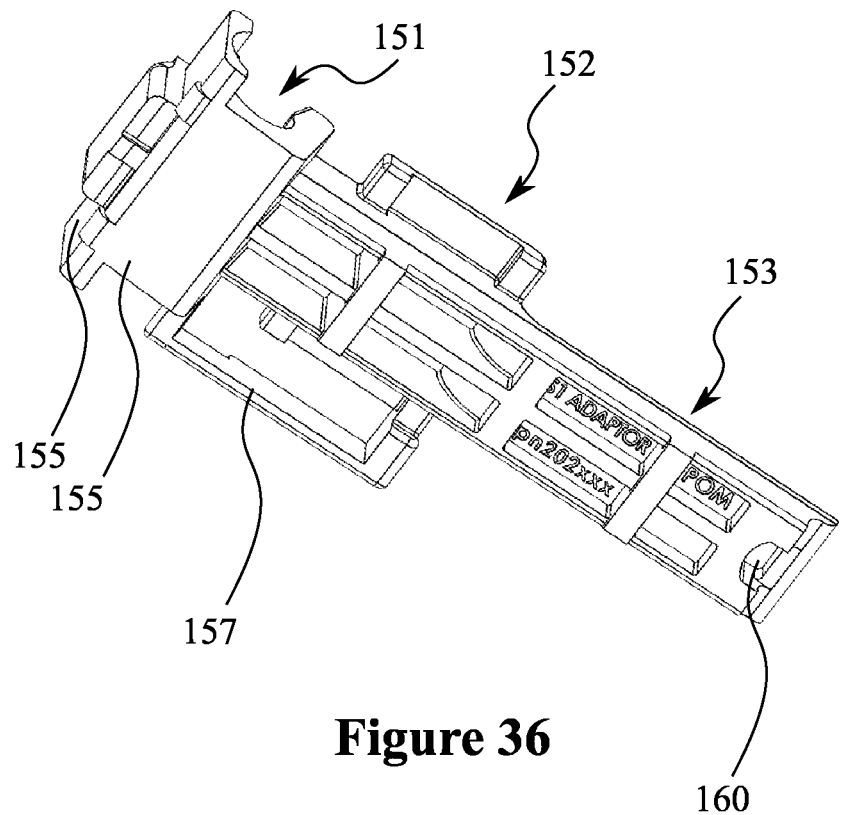
FIG. 36 is a bottom perspective view of the adapter of the connector of FIG. 18.
Figures 37, 38:
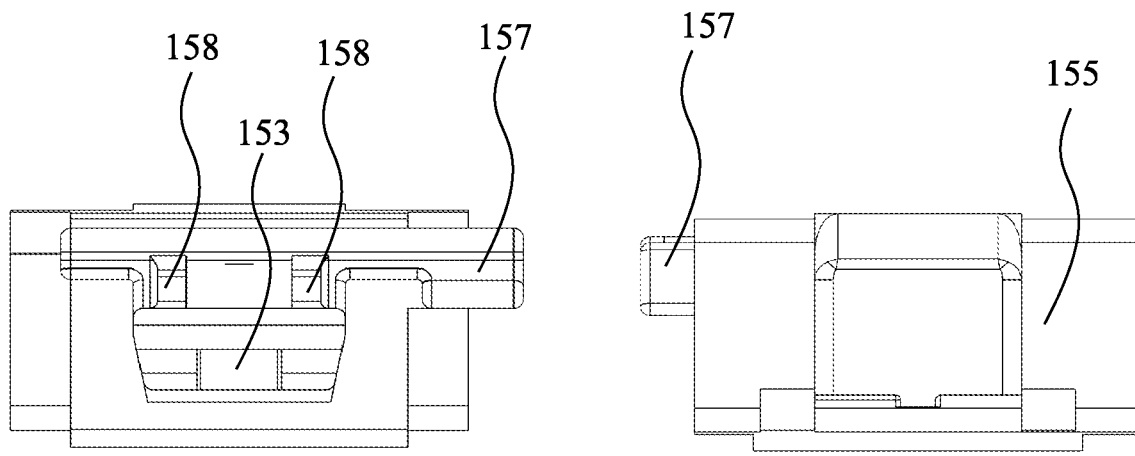
FIG. 37 is a distal end view of the adapter of the connector of FIG. 18.
FIG. 38 is a proximal end view of the adapter of the connector of FIG. 18.

Another embodiment of the invention is a wiper blade provided with a connector as described above, or as shown in FIGS. 17 and 18. The wiper blade may be of any type suitable for use with the present invention. For example, the wiper blade can be a traditional wiper blade having a plurality of frames which carry a wiper strip which act as a force distribution structure, and having a mounting base. Alternatively, the wiper blade may be a beam blade, having one or more spring-elastic beams which act as a force distribution structure, a wiper strip, and a mounting base. The wiper blade may also be a hybrid wiper blade, which has a combination of a beam and one or more frames that collectively act as a force distribution structure, a wiper strip, and a mounting base. Regardless of the type of wiper blade, the connector 1, 100 can be adapted to connect to the wiper blade, for example, via a rivet on the wiper blade (which is commonly located in a mounting base or in the frame of the wiper blade) and a rivet passage 29, 129 and arcuate rivet clips 30 a, b on embodiments of the connector 1, 100. Any other method discussed above or otherwise known in the art would also be suitable, such as having one or more pins, holes, recesses, channels, or other structure in the wiper blade, and having corresponding pin clips, detents or pins or any other structure complimentary to the structure in the connector 1.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the retaining pin apertures, locking apertures, or other mechanisms can vary so long as they are capable of performing their intended function.

I claim:

1. A windshield wiper connector for connecting a plurality of types of wiper arms with a windshield wiper, the connector having a proximal end and a distal end longitudinally opposed to the proximal end, the connector comprising:
   opposing peripheral side walls defining a channel there between;
   a groove provided in the channel defined by aligned breaks in the opposing side walls; and
   an adapter having a groove insert with an outer surface having conforming dimensions with the groove and an inner surface defining a pin passage, the groove insert of the adapter securable within the groove;
   wherein a first wiper arm type is securable in the channel, a second wiper arm type is securable in the groove, and a third wiper arm type is securable in the pin passage; and
   wherein the adapter further includes a tail securable within the channel by a resilient tab laterally projecting into the channel.

2. The connector of claim 1 further comprising a cap provided on the proximal end of the connector.

3. The connector of claim 2, wherein each of the opposing peripheral side walls includes a cap pivot hole and a cap connector securing hole, and the cap includes a pair of internal cap pivot projections each engageable with a cap pivot hole and a pair of internal cap securing projections each engageable with a cap connector securing hole, and
   wherein the cap is pivotable about a cap pivot axis defined as extending between the cap pivot holes.

4. The connector of claim 3, wherein the cap includes a top cap wall that covers the groove when the cap is pivoted into a closed position.

5. The connector of claim 1 further comprising resilient tabs laterally projecting into the channel.

6. The connector of claim 1 further comprising a pillar provided within the channel and projecting away from the channel.

7. The connector of claim 1 wherein the tail includes a pillar hole to accommodate a pillar projecting away from the channel.

8. The connector of claim 1 wherein the adapter includes a platform connected to the groove insert, and the platform includes a handle projecting laterally away from the platform beyond the side wall of the connector.

9. The connector of claim 8, wherein the platform is connected by a platform bridge having a width that is narrower than the platform.

10. A windshield wiper assembly comprising:
a windshield wiper; and
a windshield wiper connector for connecting a plurality of types of wiper arms with the windshield wiper, the connector having a proximal end and a distal end longitudinally opposed to the proximal end, the connector comprising:
opposing peripheral side walls defining a channel there between;
a groove provided in the channel defined by aligned breaks in the opposing side walls; and
an adapter having a groove insert with an outer surface having conforming dimensions with the groove and an inner surface defining a pin passage, the groove insert of the adapter securable within the groove;
wherein a first wiper arm type is securable in the channel, a second wiper arm type is securable in the groove, and a third wiper arm type is securable in the pin passage; and
wherein the adapter further includes a tail securable within the channel by a resilient tab laterally projecting into the channel.

11. The wiper assembly of claim 10 further comprising a cap provided on the proximal end of the connector.

12. The wiper assembly of claim 11, wherein each of the opposing peripheral side walls includes a cap pivot hole and a cap connector securing hole, and the cap includes a pair of internal cap pivot projections each engageable with a cap pivot hole and a pair of internal cap securing projections each engageable with a cap connector securing hole, and
wherein the cap is pivotable about a cap pivot axis defined as extending between the cap pivot holes.

13. The wiper assembly of claim 12, wherein the cap includes a top cap wall that covers the groove when the cap is pivoted into a closed position.

14. The wiper assembly of claim 10 further comprising resilient tabs laterally projecting into the channel.

15. The wiper assembly of claim 10 further comprising a pillar provided within the channel and projecting away from the channel.

16. The wiper assembly of claim 10 wherein the tail includes a pillar hole to accommodate a pillar projecting away from the channel.

17. The wiper assembly of claim 10 wherein the adapter includes a platform connected to the groove insert, and the platform includes a handle projecting laterally away from the platform beyond the side wall of the connector.

18. The wiper assembly of claim 17, wherein the platform is connected by a platform bridge having a width that is narrower than the platform.

19. A windshield wiper connector for connecting a plurality of types of wiper arms with a windshield wiper, the connector having a proximal end and a distal end longitudinally opposed to the proximal end, the connector comprising:
opposing peripheral side walls defining a channel there between, each opposing peripheral side wall includes a cap pivot hole and a cap connector securing hole;
a cap provided on the proximal end of the connector and including a pair of internal cap pivot projections each engageable with a cap pivot hole and a pair of internal cap securing projections engageable with a cap connector securing hole;
a groove provided in the channel defined by aligned breaks in the opposing side walls;
an adapter having a groove insert with an outer surface having conforming dimensions with the groove and an inner surface defining a pin passage, the groove insert of the adapter securable within the groove;
wherein the cap is pivotable about a cap pivot axis defined as extending between the cap pivot holes, and
wherein a first wiper arm type is securable in the channel, a second wiper arm type is securable in the groove, and a third wiper arm type is securable in the pin passage.

20. The connector of claim 19, wherein the cap includes a top cap wall that covers the groove when the cap is pivoted into a closed position.

21. The connector of claim 19 further comprising resilient tabs laterally projecting into the channel.

22. The connector of claim 19 further comprising a pillar provided within the channel and projecting away from the channel.

23. The connector of claim 19, wherein the adapter includes a platform connected to the groove insert, and the platform includes a handle projecting laterally away from the platform beyond the side wall of the connector.

24. The connector of claim 23, wherein the platform is connected by a platform bridge having a width that is narrower than the platform.

25. A windshield wiper assembly comprising:
a windshield wiper; and
a windshield wiper connector for connecting a plurality of types of wiper arms with the windshield wiper, the connector having a proximal end and a distal end longitudinally opposed to the proximal end, the connector comprising:
opposing peripheral side walls defining a channel there between, each opposing peripheral side wall includes a cap pivot hole and a cap connector securing hole;
a cap provided on the proximal end of the connector and including a pair of internal cap pivot projections each engageable with a cap pivot hole and a pair of internal cap securing projections engageable with a cap connector securing hole;
a groove provided in the channel defined by aligned breaks in the opposing side walls; and
an adapter having a groove insert with an outer surface having conforming dimensions with the groove and an inner surface defining a pin passage, the groove insert of the adapter securable within the groove;
wherein the cap is pivotable about a cap pivot axis defined as extending between the cap pivot holes, and wherein a first wiper arm type is securable in the channel, a second wiper arm type is securable in the groove, and a third wiper arm type is securable in the pin passage.

26. The wiper assembly of claim 25, wherein the cap includes a top cap wall that covers the groove when the cap is pivoted into a closed position.

27. The wiper assembly of claim 25 further comprising resilient tabs laterally projecting into the channel.

28. The wiper assembly of claim 25 further comprising a pillar provided within the channel and projecting away from the channel.

29. The wiper assembly of claim 25, wherein the adapter includes a platform connected to the groove insert, and the platform includes a handle projecting laterally away from the platform beyond the side wall of the connector.

30. The wiper assembly of claim 29, wherein the platform is connected by a platform bridge having a width that is narrower than the platform.

31. A windshield wiper connector for connecting a plurality of types of wiper arms with a windshield wiper, the connector having a proximal end and a distal end longitudinally opposed to the proximal end, the connector comprising:
 opposing peripheral side walls defining a channel there between;
 a groove provided in the channel defined by aligned breaks in the opposing side walls; and
 an adapter having a groove insert with an outer surface having conforming dimensions with the groove and an inner surface defining a pin passage, the groove insert of the adapter securable within the groove;
 wherein the adapter includes a platform connected to the groove insert by a platform bridge having a width that is narrower than the platform, the platform including a handle projecting laterally away form the platform beyond the side wall of the connector, and
 wherein a first wiper arm type is securable in the channel, a second wiper arm type is securable in the groove, and a third wiper arm type is securable in the pin passage.

32. The connector of claim 31 further comprising resilient tabs laterally projecting into the channel.

33. The connector of claim 31 further comprising a pillar provided within the channel and projecting away from the channel.

34. A windshield wiper assembly comprising:
 a windshield wiper; and
 a windshield wiper connector for connecting a plurality of types of wiper arms with the windshield wiper, the connector having a proximal end and a distal end longitudinally opposed to the proximal end, the connector comprising:
 opposing peripheral side walls defining a channel there between;
 a groove provided in the channel defined by aligned breaks in the opposing side walls; and
 an adapter having a groove insert with an outer surface having conforming dimensions with the groove and an inner surface defining a pin passage, the groove insert of the adapter securable within the groove;
 wherein the adapter includes a platform connected to the groove insert by a platform bridge having a width that is narrower than the platform, the platform including a handle projecting laterally away form the platform beyond the side wall of the connector, and
 wherein a first wiper arm type is securable in the channel, a second wiper arm type is securable in the groove, and a third wiper arm type is securable in the pin passage.

35. The wipe assembly of claim 34 further comprising resilient tabs laterally projecting into the channel.

36. The wiper assembly of claim 34 further comprising a pillar provided within the channel and projecting away from the channel.

* * * * *